US011533860B2

(12) United States Patent
Stevenson

(10) Patent No.: US 11,533,860 B2
(45) Date of Patent: Dec. 27, 2022

(54) HYDROPONICS SYSTEM

(71) Applicant: Justin Garrett Stevenson, Silt, CO (US)

(72) Inventor: Justin Garrett Stevenson, Silt, CO (US)

( * ) Notice: Subject to any disclaimer, the term of this patent is extended or adjusted under 35 U.S.C. 154(b) by 0 days.

(21) Appl. No.: 17/089,600

(22) Filed: Nov. 4, 2020

(65) Prior Publication Data
US 2022/0132761 A1 May 5, 2022

(51) Int. Cl.
*A01G 31/06* (2006.01)
*A01G 27/00* (2006.01)

(52) U.S. Cl.
CPC ............ *A01G 31/06* (2013.01); *A01G 27/003* (2013.01); *A01G 27/006* (2013.01)

(58) Field of Classification Search
CPC ............. A01G 2031/006; A01G 31/06; A01G 27/003; A01G 27/005
USPC .................................................. 47/62 A, 62 R
See application file for complete search history.

(56) References Cited

U.S. PATENT DOCUMENTS

| | | | | |
|---|---|---|---|---|
| 3,053,011 A * | 9/1962 | Silverman | ............... | A01G 31/06 47/79 |
| 5,076,010 A * | 12/1991 | Rollins | ............... | A01G 27/003 47/62 R |
| 5,675,932 A * | 10/1997 | Mauney | ............... | A01G 31/02 47/17 |
| 8,726,568 B2 * | 5/2014 | Wilson | ............... | A01G 31/02 47/62 R |
| 9,648,811 B2 * | 5/2017 | Narasipur | ............... | A01G 31/02 |
| 9,807,949 B2 * | 11/2017 | Hamlin | ............... | A01G 27/003 |
| 9,974,250 B1 * | 5/2018 | Creekmore | ............... | A01G 31/00 |
| 10,070,600 B2 * | 9/2018 | Orff | ............... | A01G 31/02 |
| 2010/0095586 A1 * | 4/2010 | Sichello | ............... | E04F 13/0801 47/65.9 |
| 2010/0199555 A1 * | 8/2010 | Pole | ............... | A01G 27/005 47/62 R |
| 2011/0179708 A1 * | 7/2011 | Stewart | ............... | A01G 27/04 47/65.9 |
| 2012/0005957 A1 * | 1/2012 | Downs, Sr. | ............... | A01G 31/02 47/62 A |

(Continued)

FOREIGN PATENT DOCUMENTS

FR 2652232 A1 * 3/1991 ........... A01G 27/003
WO WO-2015001763 A1 * 1/2015 ............. A01G 9/00

*Primary Examiner* — Brady W Frazier
(74) *Attorney, Agent, or Firm* — Holland & Hart LLP

(57) ABSTRACT

Hydroponics systems and methods of efficient, configurable nutrient solution grow reservoirs include shared components while creating more space in grow facilities. The hydroponics systems include vertical and horizontal rows or layouts of connected reservoirs that may include movable reservoirs to allow for better user access and reduce aisles, which allows space for more reservoirs in a grow facility. Multiple reservoirs may be connected to one another by irrigation tubing (e.g., as shown in in vertical layouts) or by pipes or irrigation tubing (e.g., as shown in horizontal layouts) and share various multiple system components, such as water pumps, water chillers, air pumps, float valves, and drain out systems. In some implementations, incorporation of the 4" pipes in the horizontal layouts provides for efficient water circulation in a closed loop configuration throughout the disclosed hydroponic systems.

19 Claims, 16 Drawing Sheets

(56) References Cited

U.S. PATENT DOCUMENTS

| | | | | |
|---|---|---|---|---|
| 2015/0296725 | A1* | 10/2015 | Mong | A01G 31/02 47/62 A |
| 2016/0174477 | A1* | 6/2016 | Li | A01G 27/005 47/48.5 |
| 2018/0368346 | A1* | 12/2018 | Watson | A01G 31/06 |
| 2019/0223395 | A1* | 7/2019 | Warrick | A01G 9/027 |
| 2019/0269078 | A1* | 9/2019 | Gao | A01G 31/02 |
| 2020/0022323 | A1* | 1/2020 | Mendes | A01G 27/005 |
| 2020/0163295 | A1* | 5/2020 | Mata | A01G 27/005 |
| 2021/0176934 | A1* | 6/2021 | Su | A01G 27/005 |
| 2021/0321584 | A1* | 10/2021 | Campau | A01G 27/008 |
| 2022/0071103 | A1* | 3/2022 | Venderbosch | A01G 9/0295 |
| 2022/0117180 | A1* | 4/2022 | Friedman | A01G 31/06 |

* cited by examiner

HYDROPONICS SYSTEM

BACKGROUND

Hydroponics systems require adequate delivery of necessary nutrients and water to growing plants and control of temperature, pH, concentration, and oxygenation of the plants growing in the systems.

SUMMARY

The present disclosure is directed to hydroponics systems and methods. In some implementations, hydroponics systems include efficient, configurable grow reservoirs that utilize shared components while creating more space in grow facilities. The systems include vertical and horizontal rows or layouts of connected reservoirs and may be implemented with movable reservoirs to allow for access and reduce space.

In some implementations, systems include multiple reservoirs for holding nutrient solution. The multiple reservoirs may be connected to one another by irrigation tubing (e.g., in vertical layouts and in horizontal layouts) or by pipes (e.g., horizontal layouts). Incorporation of the pipes (4" pipes) in the layouts provides for efficient water circulation in a closed loop configuration throughout the systems in combination with one or more shared water pumps.

In some implementations, the systems include at least one shared float valve located in one or more reservoirs to maintain a predetermined water level. In some implementations, the reservoirs include at least one flat corner wall to receive components through apertures located in the flat corner wall to make connections to system components easier and to save space in a facility. Each reservoir may also include a bottom wall with an uneven surface, such as at least one channel in an interior surface, for increased movement of air or water.

In some implementations, the systems include at least one shared air pump to transport air to multiple reservoirs in a system with aeration tubing. In some implementations, the systems include at least one shared water chiller configured to lower the temperature of water in the hydroponics system.

The disclosed technology may include reservoirs that may be configured in rows and moveable (e.g., on wheels) so that the rows can be arranged to eliminate aisles in a facility and allow for additional space for additional reservoirs or for other equipment or merely for additional space. In some implementations, control reservoirs may be incorporated into a horizontal or vertical system layout to increase the efficiency of the hydroponic systems while conserving space.

In some implementations, the disclosed systems include at least one shared drain out system in the reservoirs to drain water from an entire row of reservoirs at the same time.

These and various other features and advantages will be apparent from reading the following detailed description.

DETAILED DESCRIPTION

Figure 1:
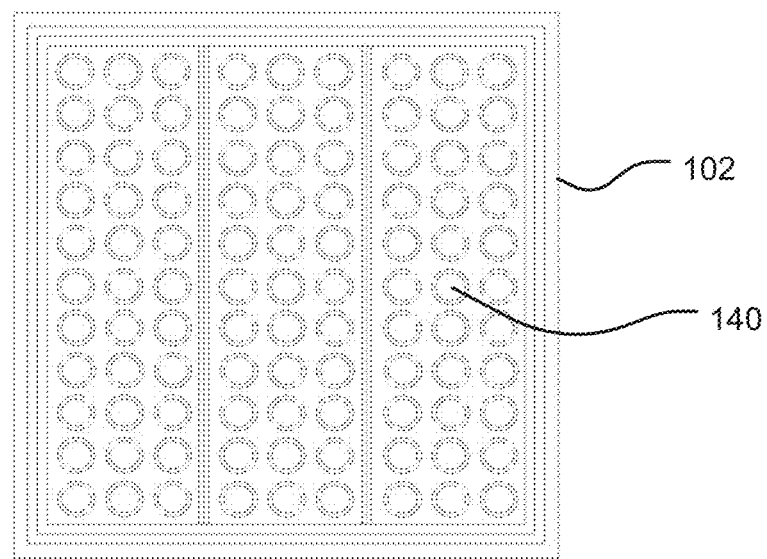
FIG. 1 is an illustration of an example lid and example reservoir in a hydroponics system according to the present disclosure.
Figure 1:
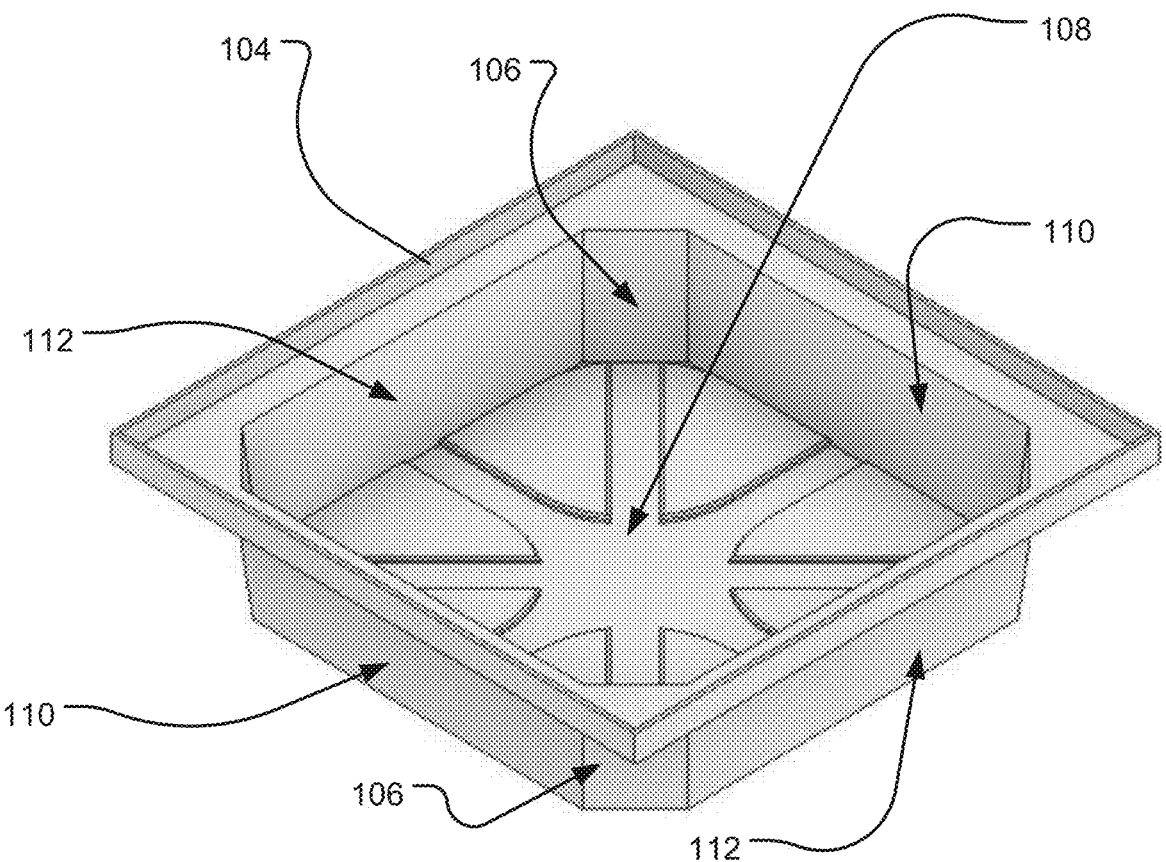

The present disclosure describes hydroponics systems, methods, and related technology to provide a constant supply of nutrient solution (e.g., essential nutrients and water) in a water solvent to growing plants. The disclosed technology includes several system components (e.g., water pump, air pump, float valve) configured to ensure this constant supply of essential nutrients and water.

Specifically, the disclosed systems and methods provide connectivity among multiple grow reservoirs, which includes shared components to meet adequate nutrient requirements in large scale grow operations. The term "shared" refers to one or more components that are used in a hydroponics system and provide a benefit to multiple reservoirs in the system and eliminate the need for each reservoir to have all of its own components. For example, the systems may include a shared water pump, a shared air pump, and/or a shared water chiller. The shared water pump may pump and pull water in a closed loop configuration throughout the reservoirs. A shared air pump may provide air via aeration tubing to the water in the reservoirs. A shared water chiller may lower the temperature of the water in the hydroponics system. Therefore, each reservoir does not require its own water pump, its own air pump, and its own water chiller. In some implementations, shared drain out systems and float valves may be shared in a hydroponics system. As a result, space is conserved in a grow facility (or other space or building) housing a hydroponics system. In some implementations, there may be one or more shared components. For example, there may be more than one shared water pump to maintain the water level height in the reservoirs throughout the system.

In some implementations, the disclosed hydroponics systems may provide an abundance of water to the roots of plants via constant transport of water between reservoirs. A shared float valve can be supplied in a reservoir with various sources of water or nutrient solutions such as a basic tap with city or well water or a tank of water or nutrient solution. The water can be added manually, for example, topping off with a hose or bucket or automatically, such as using a hose connected to tap water and a float valve. In some implementations, a reverse osmosis water filter can be used along with various other devices such as a nutrient injector dosing system which can be added to maintain the nutrient and pH levels based on the feed schedule entered into the computer program. The reservoirs in the systems may be connected to each other by a network of pipes or irrigation tubing in a closed loop configuration where water circulates continuously throughout the system.

In addition to water, plants also need constant oxygenation. Otherwise, roots can struggle to obtain sufficient oxygen. This can be seen in scenarios where roots are constantly immersed in water (e.g., deep water culture or nutrient film technique). Shared air pumps may be incorporated into the disclosed hydroponics systems to deliver oxygen to nutrient solution in the reservoirs.

In some implementations, lids for the reservoirs may be incorporated into the disclosed hydroponics systems to eliminate evaporation of a nutrient solution in the reservoir. Evaporation can lead to an increased rate of change in concentration of a nutrient solution, and as a result, require more system adjustments. Lids also keep a reservoir from getting contaminated or prevent the entrance of foreign objects or light, which can lead to algae growth.

The disclosed hydroponics systems are scalable and may include large configuration of multiple rows and columns of reservoirs, as well as vertical and horizontal layouts of reservoirs. The hydroponics systems can move large volumes of water and be configured for better spacing in a facility.

In some implementations, the disclosed technology includes fans, lights, water chillers, heaters, monitors, meters, trellises, float valves, reverse osmosis, pH buffering, and nutrient injector systems, computer simulations and models, enhanced aeration systems, etc. For example, a hydroponics system may provide that water through the float valve that can be replenished with a tank or refilled with a reverse osmosis, tap, etc. Specifically, a tank filled with nutrient solution can be fed (using a gravity, a pump, etc.) to the system. In some cases, other devices, such as an automatic nutrient injector dose, pH buffer injector, etc., may be used.

The examples provided in the figures include many components, some of which may be optional, and which are described for illustration in one example but may be incorporated into the other examples. The components may also be incorporated into a given hydroponics system and located on the outside or in the inside of the reservoirs, depending on the implementation. The components available for incorporation inside or outside the reservoirs may also be incorporated in any of the example horizontal and vertical layouts. The reservoirs may be configured and stacked on various platforms, structures, tables, etc. that allow the reservoirs to be aligned for connectivity in the horizontal and vertical layouts. In the figures, as shown, there may be duplicative component parts that are not marked with reference numerals, for purposes of simplifying the illustration. The duplicative component parts should be given the same interpretation as described in the original descriptions. For example, in FIG. 6B, there are sixteen grow reservoirs shown and only two reservoirs 604 are marked. The fourteen unmarked reservoirs may be interpreted to each be a reservoir 604.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present invention. The following detailed description, therefore, is not to be taken in a limiting sense. While the present invention is not so limited, an appreciation of various aspects of the invention will be gained through a discussion of the examples provided below.

Referring to FIG. 1, an illustration of a top view of a lid 102 and a perspective view of a grow reservoir 104 in a hydroponics system 100 according to the present disclosure is shown. The reservoir lid 102 and the reservoir 104 may be various shapes (e.g., rectangle).

The reservoir lid 102 may include smaller (e.g., 2") or bigger (e.g., 6") apertures 140 or no apertures. In some implementations, the reservoir lid 102 may include a humidity dome. In implementations where the reservoir lid 102 includes apertures, the apertures may be placed in different locations. For example, in some implementations, the apertures are symmetrical and spaced out for the plants to grow.

In some implementations, as shown in FIG. 1, the reservoir 104 includes flat corner walls 106 of the reservoir 104. Specifically, instead of in a traditional rectangular reservoir or container, where a side wall 110 and an end wall 112 connect directly to each other in a corner of the reservoir 104 in a 90° angle to form a perfect rectangle, in this implementation, a flat or beveled wall (flat corner wall 106) is located in the corner of the reservoir 104 parallel to a center of the reservoir 104 such a flat corner wall 106 of the reservoir 104 connects the side wall 110 and the end wall 112 of the reservoir 104 to each other. The flat corner walls 106 provide extra walls in the reservoir 104 to facilitate easy, better, and additional access for connections of components to the hydroponics system 100. Apertures (shown and described in FIGS. 2A-C) may be configured in the flat corner walls 106 and other walls of the reservoir 104 to allow for system components to connect through or up to the aperture for access to the reservoir 104. The apertures may be located in various locations of the reservoirs and in various numbers and sizes (e.g., for large volumes of water) to facilitate easier access and better layout for more efficient system configurations. Grommets or other sealants, bulkhead fittings, connectors, etc. may be used to seal connections at the apertures.

In some implementations, as shown in FIG. 1, an interior surface of a bottom wall 108 of the reservoir 104 may be an uneven surface. In some examples, the interior surface has channels (e.g., passages, grooves, or other depressed areas) in the bottom wall 108 to allow for cooling underneath at the bottom of the reservoir 104. For example, the pumps or other components parts (e.g. water pump or air pump) of the hydroponics system 100 may heat up the water in the reservoir 104. The uneven surface provides passages for airflow to cool the water.

The uneven surface of the bottom wall 108 can also help with draining of the reservoir. For example, the uneven surface allows for water or other solutions to be completely drained via a drain out system (e.g., drain water out an aperture 316 for draining water, described in detail in FIG. 3). A drain out aperture may be incorporated into a side wall or the bottom wall 108 of the reservoir. Irrigation tubing is attached to the drain out aperture. In some implementations, the irrigation tubing is connected to one or more drain out apertures located on one or more reservoirs. One or more shut off valves may be connected to the irrigation tubing. If the shut off valves are closed, water can fill the bottom of the reservoirs and the irrigation tubing. When a user opens the shut off valves, water can be removed from one or more reservoirs via the irrigation tubing.

Figure 2A:
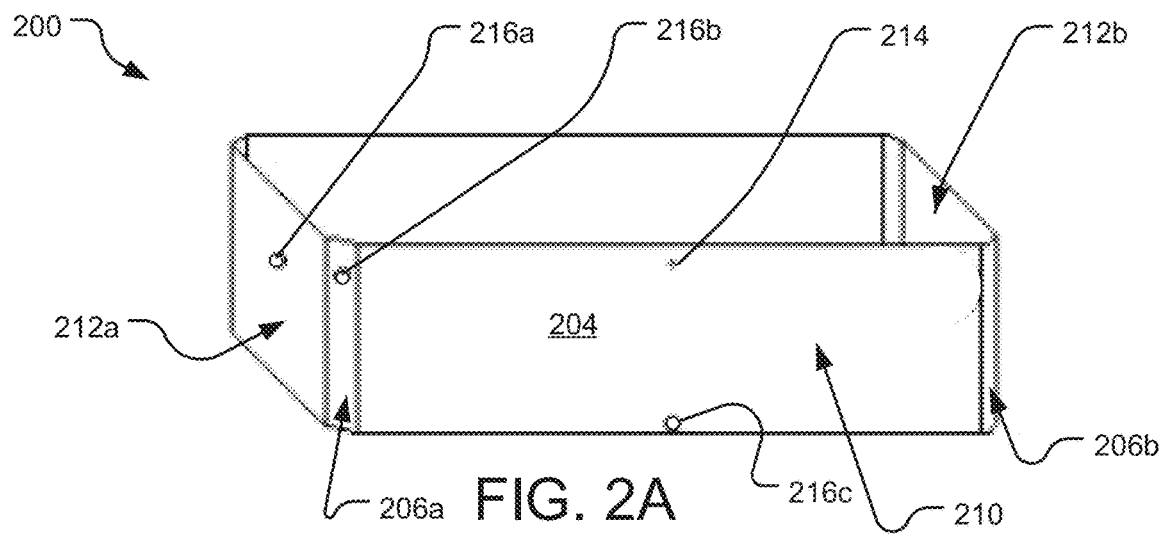
FIGS. 2A-C are illustrations of example reservoirs in a hydroponics system according to the present disclosure.
Figure 2B:
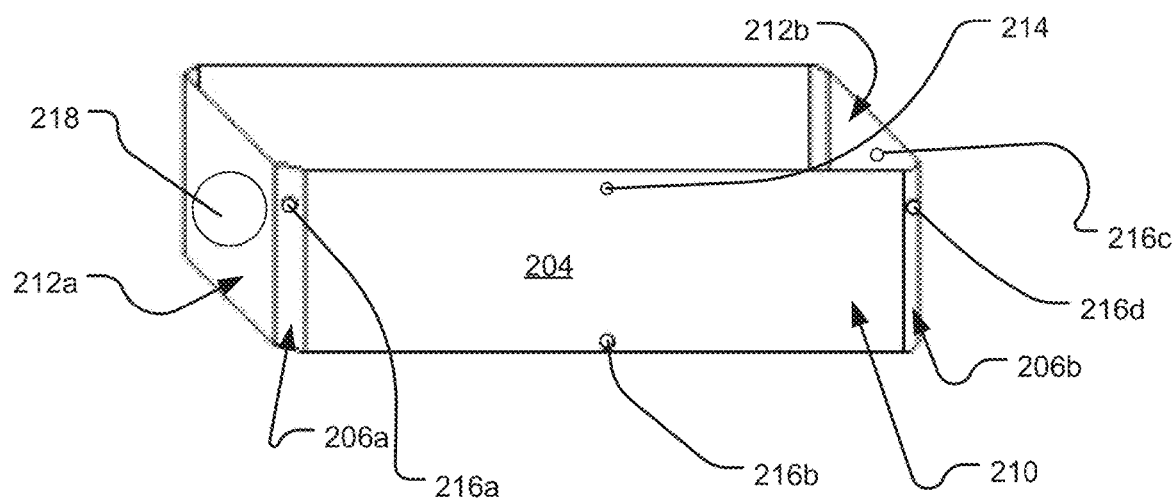
Figure 2C:
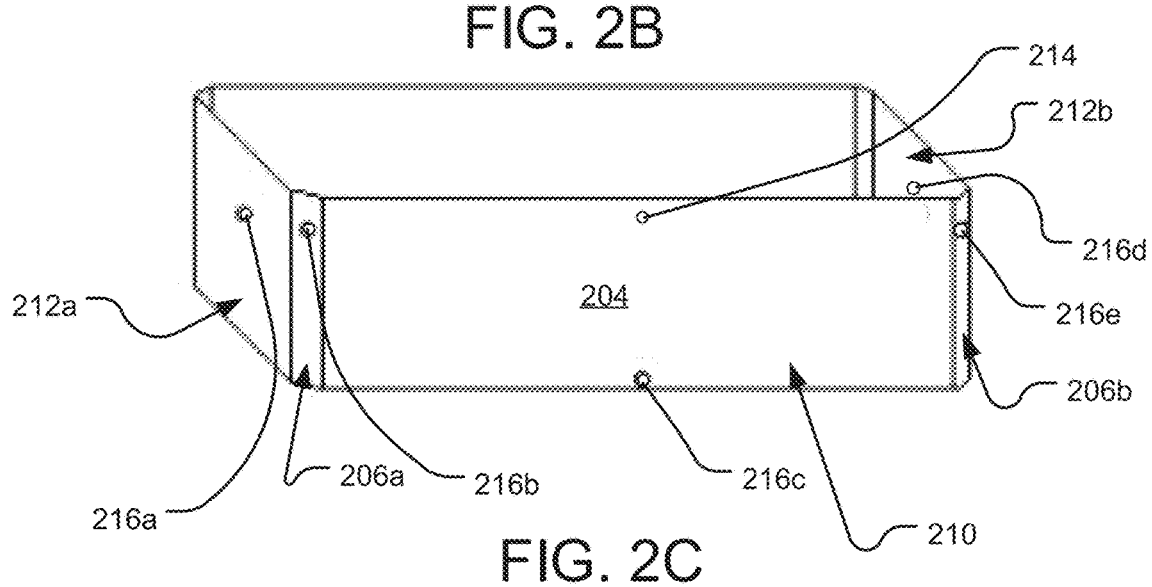

FIGS. 2A-C are illustrations of example grow reservoirs 204 in hydroponics systems 200 according to the present disclosure. As shown, apertures can be placed in various locations on the reservoirs 204 in the disclosed technology, including in the flat corner walls 206a and 206b, the side walls 210, and/or the end walls 212 of the of the reservoirs 204 to facilitate connectivity to certain component parts in a hydroponics system 200. Any number of apertures may be configured on any of the walls of the reservoirs 204, as needed, and in various sizes.

For example, as shown in FIG. 2A, a first aperture 214 may be located on a side wall 210. In some examples, the first aperture 214 may be configured to receive smaller components, such as connectors or components (e.g., float valves, nutrient injectors, aeration tubing, as described in the following figures), which can vary in size (e.g., ⅜"). The apertures may be used with rubber grommets, for example, to connect such connectors.

A second aperture 216a may be located on an end wall 212, a second aperture 216b may be located on a flat corner wall 206, and a second aperture 216c may be located on the side wall 210. In some examples, the second apertures 216a-c may be configured to receive components, such as connectors or components (e.g. irrigation tubing, as described in the following figures) which can vary in size (e.g., ¾", 1", etc.).

In some implementations, an elbow or straight connector with a grommet or tub outlet or inlet bulkhead fitting with or without a filter screen may be used. For example, a bulkhead fitting (e.g., 1" and ¾") with a screen may be used in combination with an aperture where the screen prevents roots from growing through an aperture and/or tubing and prevents the roots from clogging the aperture and/or tubing. Such screen and bulkhead fitting may be used, for example, in aperture 1116a in FIG. 11.

In another example, as shown in FIG. 2B, a third aperture 218 may be located on an end wall 212a. In some examples, the third aperture 218 may be configured to receive components, such as connectors or components (e.g., a 4" pipe, as described in the following figures) which can vary in size (e.g., 3", 4", 6", etc.). Specifically, the third aperture(s) may be located on at least one of the end walls 212a and 212b wherein a pipe can connect at the third aperture(s) to two reservoirs.

A second aperture 216a may be located on a flat corner wall 206a. A first aperture 214, a second aperture 216c may be located on an end wall 212b, and a second aperture 216b may be located on a side wall 210. A second aperture 216d may be located on a flat corner wall 206b. The reservoirs may be constructed in numerous configurations with various sized apertures in various locations.

In another example, as shown in FIG. 2C, a second aperture 216a may be located on an end wall 212a, a second aperture 216b may be located on a flat corner wall 206a, a second aperture 216c may be located on a side wall 210, and a second aperture 216d may be located on an end wall 212b. A second aperture 216e may be located on a flat corner wall 206b.

Figure 3:
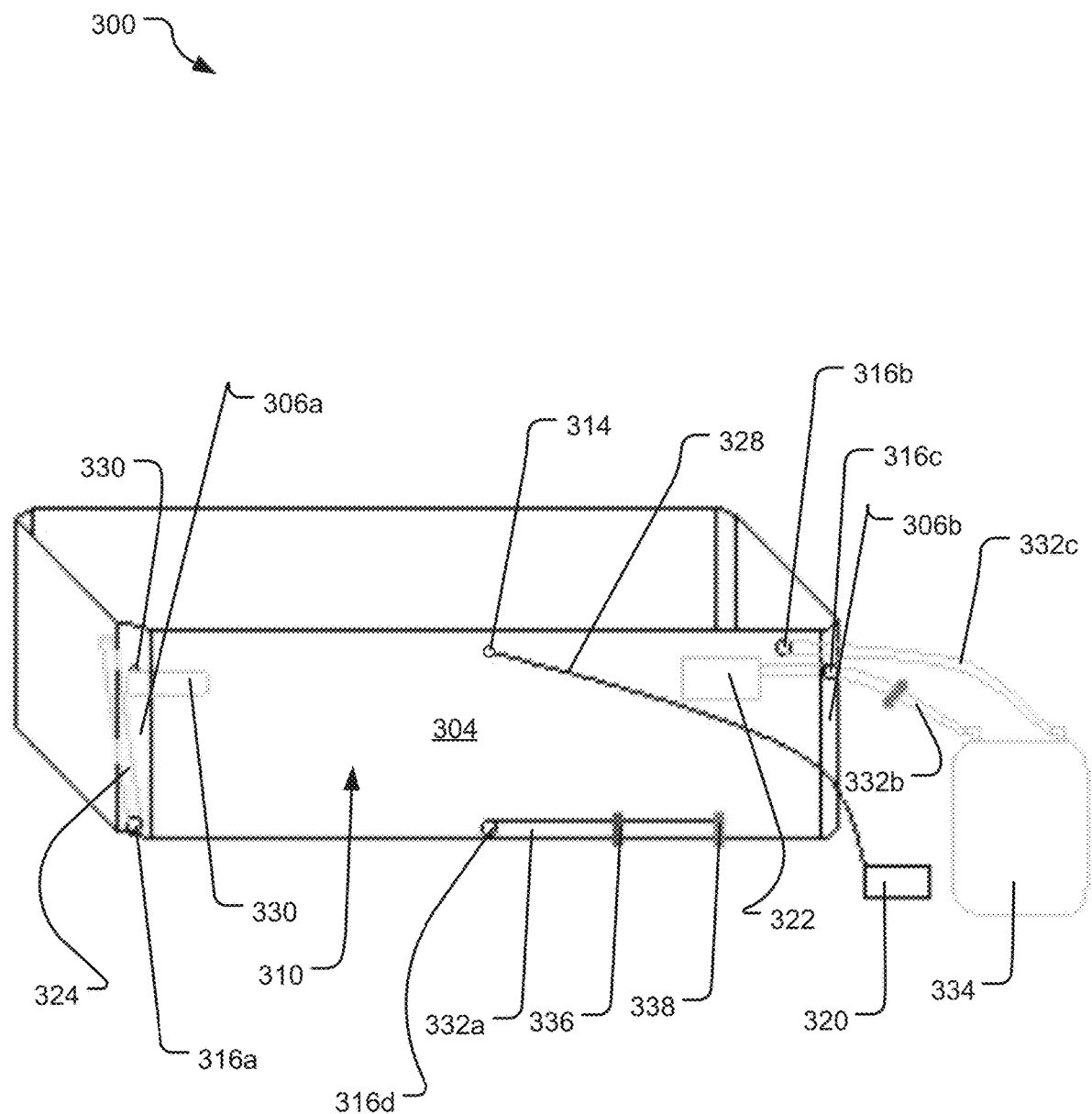
FIG. 3 is an illustration of an example hydroponics system according to the present disclosure.
Figure 4:
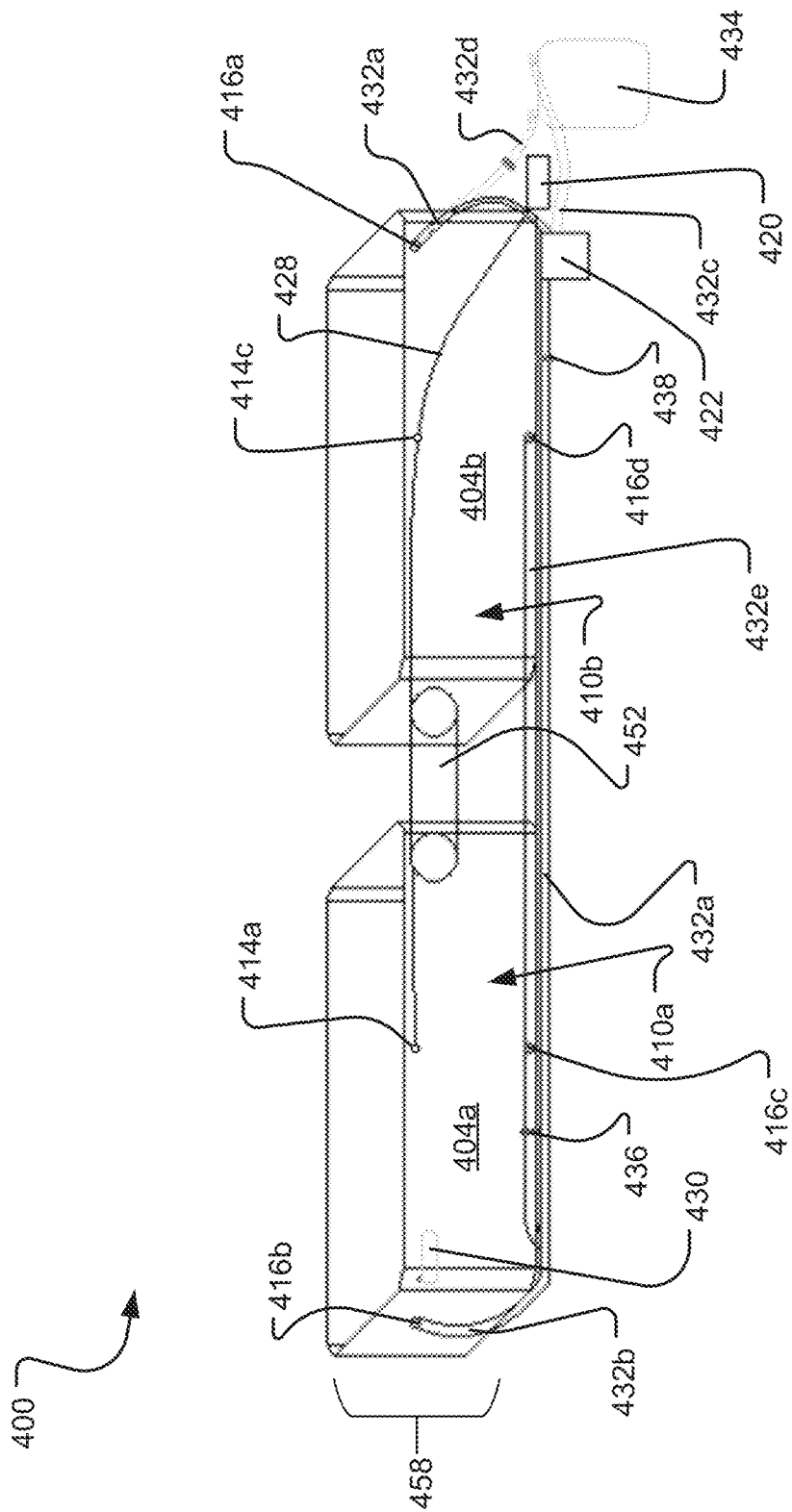
FIG. 4 is an illustration of an example hydroponics system according to the present disclosure.
Figure 5:
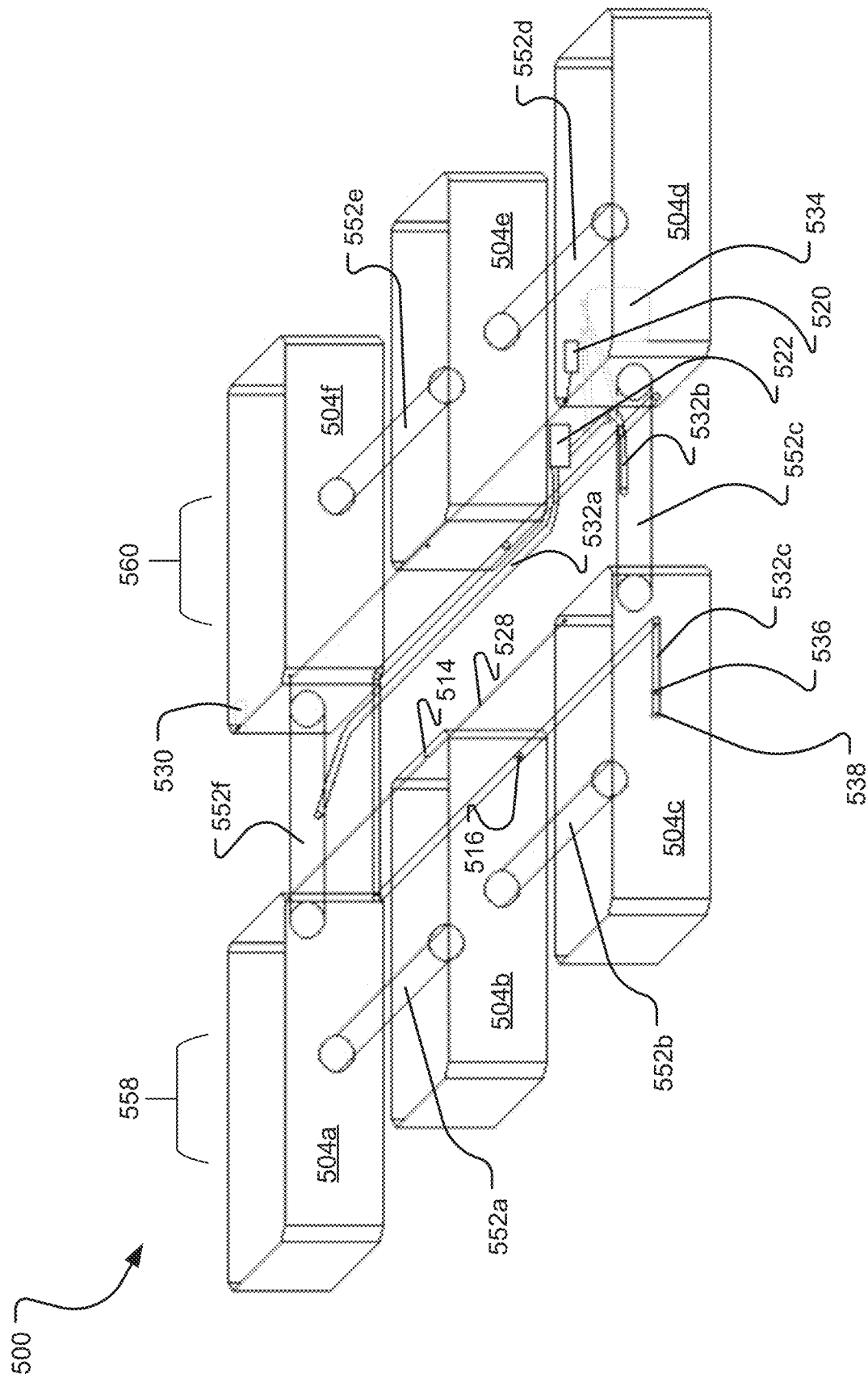
FIG. 5 is an illustration of an example hydroponics system according to the present disclosure.
Figure 11:
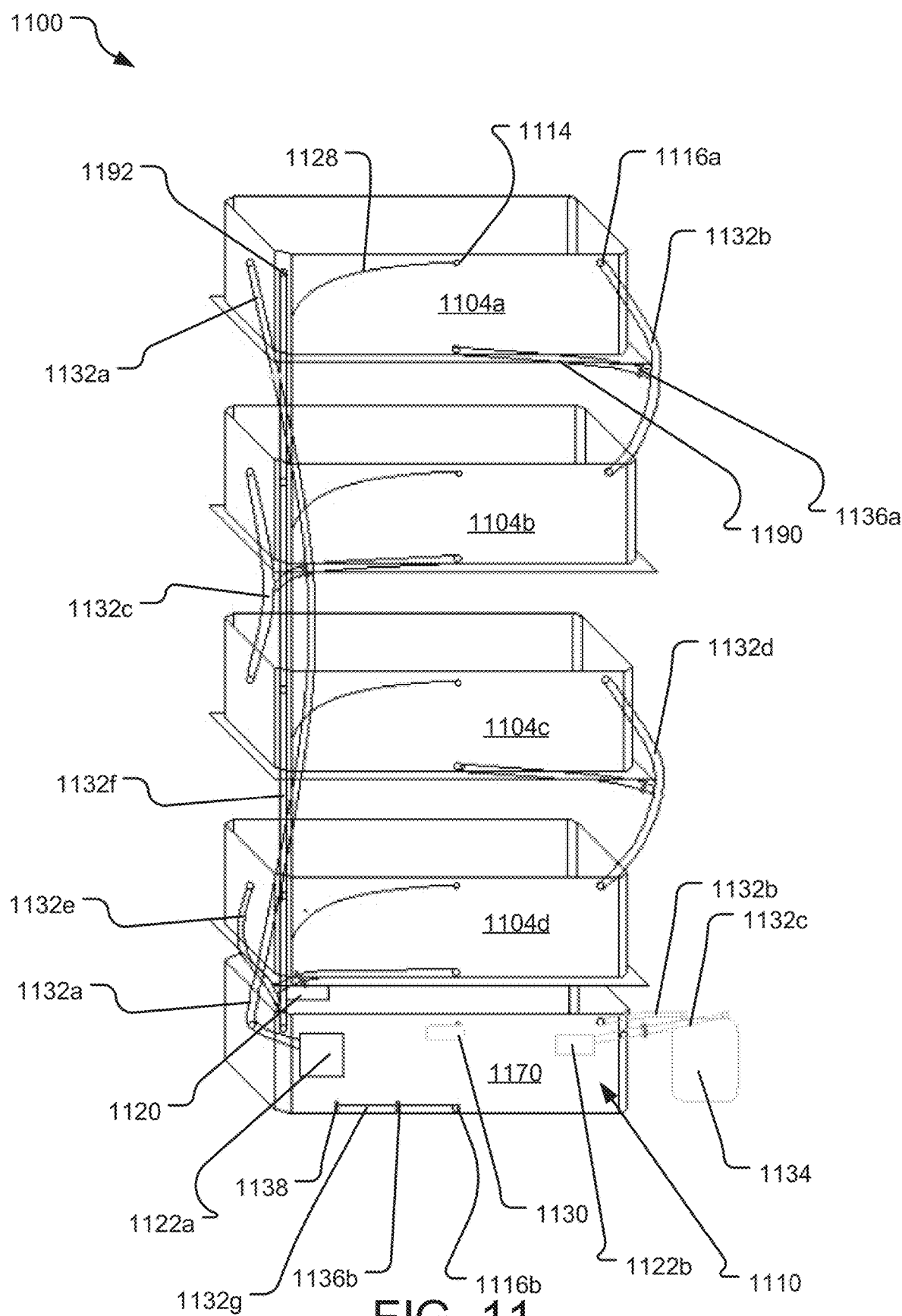
FIG. 11 is an illustration of an example hydroponics system according to the present disclosure.
Figure 12:
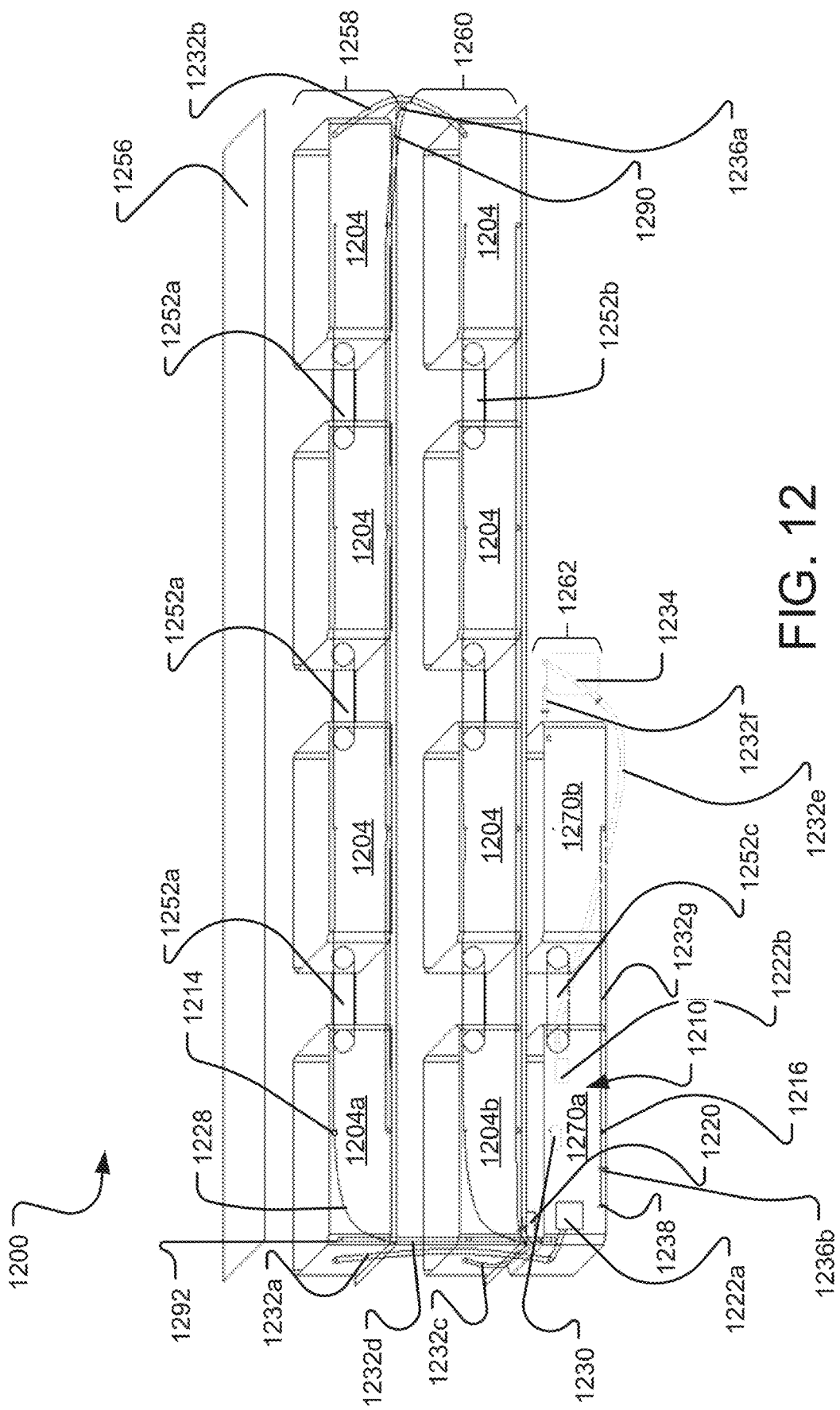
FIG. 12 is an illustration of an example hydroponics system according to the present disclosure.
Figure 13:
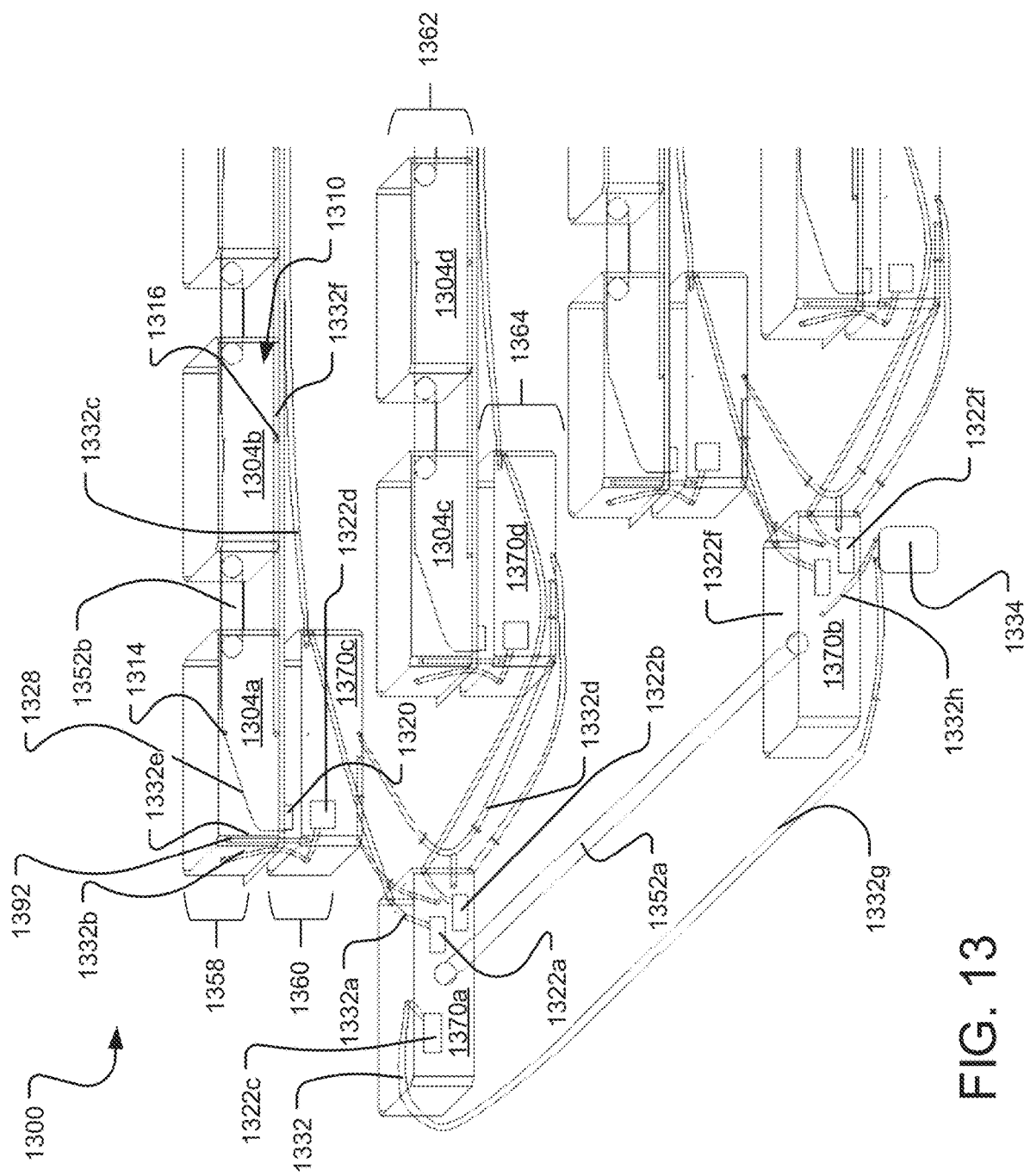
FIG. 13 is an illustration of an example hydroponics system according to the present disclosure.
Figure 14:
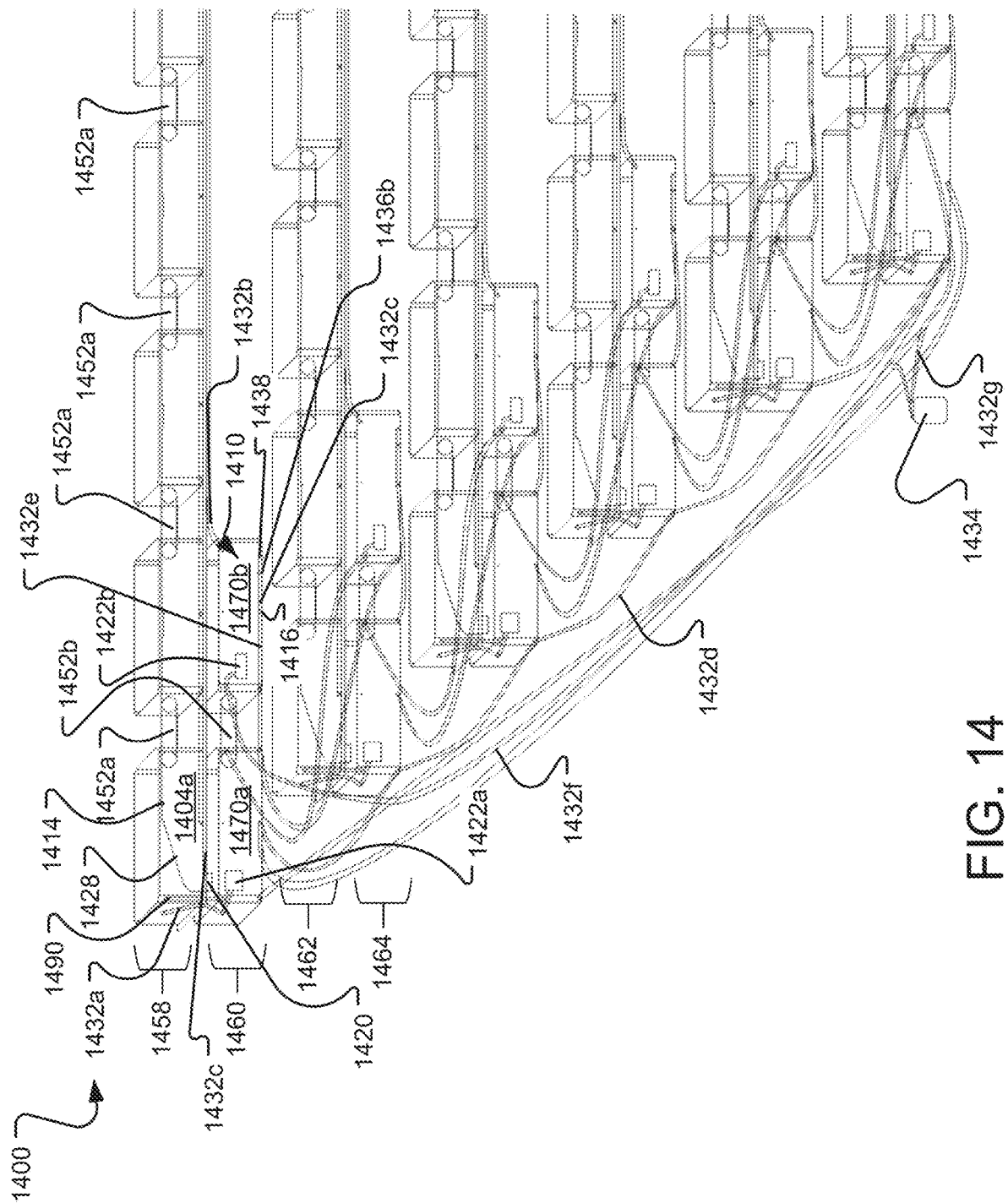
FIG. 14 is an illustration of an example hydroponics system according to the present disclosure.

The disclosed technology provides for expandable, customizable layouts, with multiple rows and columns of reservoirs, using as many reservoir units as desired. The examples provided are for illustration, and systems can be configured with any numbers of reservoirs. As provided below, a single unit system is shown in FIG. 3, a single row system is shown in FIG. 4, and a double row system is shown in FIG. 5, and a rolling double row in FIG. 9. Additionally, the examples shown in FIGS. 4, 5, and 6 are horizontal layouts, with reservoirs connected to each other in a horizontal configuration. The disclosed technology also includes vertical layouts, with reservoirs connected to each other in a vertical configuration, as shown in FIG. 11. The disclosed technology also includes vertical and horizontal layouts, with reservoirs connected to each other in vertical and horizontal configurations, as shown in FIGS. 12, 13, and 14. Various amounts of reservoirs and layouts can be used vertically and horizontally.

Referring to FIG. 3, an illustration of one single unit or grow reservoir 304 in an example hydroponics system 300 according to the present disclosure is shown. The reservoir 304 is shown in a sectional view to show that components may be located inside the reservoir. In other implementations (as shown and described in multi-unit reservoir hydroponics systems FIGS. 4, 6, and 6), the hydroponics system may have one or more reservoirs.

The single unit reservoir 304 in FIG. 3 includes multiple component parts. Several component parts are shown configured to the reservoir 304 via apertures on the walls of the reservoir 304. For example, apertures 316a is shown on flat corner wall 306a, apertures 316b and 316d are shown on side wall 310, and aperture 316c is shown on the flat corner walls 306b, and a side wall 310 in FIG. 3. In some implementations, the apertures may be present in other surfaces of the reservoir (e.g., an end wall and a bottom wall of the reservoir) and in a reservoir lid (not shown). As will be described below, the single unit or reservoir 304 in FIG. 3 may have a float valve 330, a drain out system, a water pump 322, and a water chiller 334, a water level check gauge 324, an air pump 320 and diffuser, etc. These components may be optional.

In FIG. 3, a float valve 330 is shown in the reservoir 304. The float valve 330 is located inside the reservoir 304 and shown where it may be placed. Water enters the reservoir 304 (either via a pipe or irrigation tubing) through the float valve. Plants growing inside the reservoir 304 drink the water, as the water continues to enter at a constant rate to the reservoir 304. The float valve 330 may be located in the reservoir 304 to maintain a predetermined water level and control the constant flow of water into the reservoir. The float valve shuts off the flow of water into the system when the water level reaches a predetermined height so the water does not overflow out of the grow reservoir 304.

In some implementations, a water level check gauge 324 may be included in the system 300. In FIG. 3, a water level check gauge 324 is shown located on the flat corner wall 306a via an aperture 316a. A water level check gauge 324 can allow the water level to be checked by an operator from the outside of the reservoir.

In some implementations, the disclosed technology includes a water level check gauge 324 with green translucent tubing. Light can promote algae growth in the nutrient solution and rapid changes in the temperature and pH of a nutrient solution, which can adversely impact the health of plants. The green translucent tubing used in these systems 300 prevents all colors of light except for green from entering the reservoir. As a result, the green translucent tubing prevents algae growth. The green translucent tubing can be made out of different types of polymer materials such as polyethylene, vinyl, etc.

The hydroponics system 300 also includes a drain out system. The drain out system facilitates water drainage from inside the reservoir 304 to a side or a bottom wall of the reservoir 304, and out of the reservoir 304, and is made up of several features. The drain out system includes irrigation tubing 332a that is connected to the reservoir 304 via an aperture 316d, a shut off valve 336, and an adapter 338. An aperture 316d in FIG. 3 is shown on the side wall 310. In some implementations, the aperture 316d for drain out may be located in or near the passages in the uneven surface of the bottom wall (as shown in FIG. 1) of the reservoir 304. Other configurations for a drain out are contemplated.

The adapter 338 in the drain out system shown in FIG. 3 may be used as a tubing to hose adapter to move water from the reservoir 304 through a garden hose or other type of hose or tubing (not shown), either by draining or pumping. The adapter 338 may be male or female. For example, the adapter may be a male garden hose to tubing (e.g., ¾', ½", 1", etc.), female garden hose to tubing, or both a male garden hose to tubing and a female garden hose to tubing.

In FIG. 3, a water pump 322 is located inside the reservoir 304. In some implementations, the water pump 322 may be located outside the reservoir (e.g., water pumps in multi-unit systems (for example, as shown in FIGS. 5 and 6). The water pump 322 may be connected to an irrigation tubing to pump water from the reservoir, circulate water within the reservoir 304, pump water to a water chiller 334, and back to the reservoir 304.

Other devices, such as a water filter, reverse osmosis system, etc., can be added to the system 300. As the water/nutrient solution level decreases within the reservoir 304 over time when the plants grow, the water/nutrient solution can be replenished from various methods. The water level may not need to be replenished when using the system 300 for propagation or for plants that do not absorb much water within the reservoir 304. When plants are small, regardless of whether they are seedlings or cuttings, the water/nutrient solution levels within the reservoir 304 can remain sufficient for several weeks. Many situations will require the nutrient solution to be topped off/replenished as the plants grow. The liquid nutrient solution can be refilled automatically or manually, such as premixing it in a bucket and pouring or pumping it into the reservoir 304. A float valve 330 could also be used and hooked up to a tap or tank 1572, shown in FIG. 15, keeping the water in the reservoir at the preferred level. A nutrient doser can also be hooked up and programmed to automatically replenish and maintain the nutrient, pH levels, etc. in the solution within the reservoir. Backup battery and/or energy supply (from various sources including but not limited to all kinds of renewable energy sources) can be installed in case there is a power outage for all of the automated components to remain working until the main power source turns on again.

Various other features are contemplated to be incorporated into the expandable hydroponic growing system that increase efficiency in this automated hydroponic growing system. For example, smart technology may be incorporated (e.g., notifications on smart devices for when the levels veer too far outside of the ideal range).

In some implementations, as shown in FIG. 3, the water pump 322 is connected via the irrigation tubing 332b to a water chiller 334. As shown in FIG. 3, the water pump 322 connects to irrigation tubing 332b, which extends through a second aperture 316c in the flat corner wall 306b to the water chiller 334. Maintaining a nutrient solution within a target temperature range can be crucial for the health of plants. The water chiller 334 can help maintain the temperature in a reservoir, specifically cooling the water (e.g., cools the water in a range of approximately 65°-75°) and returning the cooled water to the reservoir 304 via a second irrigation tubing 332c through a third aperture 316b to cool the reservoir. Similarly, in some implementations, a water heater may be connected to the water pump 332 to heat the water in the system 300 or the water heater could be placed directly in the reservoir itself. In some implementations, a system 300 may not include a water chiller or a water heater.

In FIG. 3, an air pump 320 is located outside the reservoir 304 and is connected to aeration tubing 328 which connects to the reservoir via a first aperture 314 in a side wall 310 of the reservoir 304. In some implementations, the aperture may be approximately ⅜" but other sizes are contemplated. The air pump 320 pumps air into the reservoir 304 and may be connected to an air diffuser or an air stone (see air stone 1578, shown in FIG. 15) in the reservoir. The air diffuser or air stone diffuses oxygen by pumping air through a stone or tube to create bubbles which infuse the water with more oxygen. The air stone is aerated via an aeration pump, tubing and connector fittings usually ³⁄₁₆", ¼", or ⅜", etc. The aeration tubing can be reduced down from the main line with connector fittings to ensure the desired amount of air is diffused into each reservoir which conserves energy. Additionally, to conserve energy, gauges can be installed to measure and fine tune the air pressure.

The components described and shown in FIG. 3 may be used in a single unit hydroponics system (e.g., also shown in hydroponics systems 200 in FIG. 2A-C) or in a multi-unit hydroponics system (e.g., hydroponics systems 400, 500, 600 in FIGS. 4-6). Any combination of these components may be included, depending on the desired use and processes of each system. Also, the components may be shared by reservoirs in a multi-unit system.

Referring to FIG. 4, an example hydroponics system 400 according to the present disclosure is shown. The grow reservoirs 404a and 404b are shown in a sectional view to show that components may be located inside the reservoir. The system 400 shows a single row system (e.g., row 458) of two units or grow reservoirs 404a and 404b. In a single row system, any number of grow reservoirs 404 may be used, and configured to connect to one another in a single row. The grow reservoirs 404a and 404b have multiple component parts connecting the grow reservoirs 404a and 404b to each other. For example, a pipe 452 is shown connecting to both grow reservoirs 404a and 404b. The pipe 452 connects to each reservoir with a water-tight seal and can vary in size. The pipes shown in FIG. 4 are contemplated to be 4" pipes, however, other sizes are contemplated. Systems with smaller amounts of reservoirs and smaller reservoirs may use smaller pipe and systems with larger amounts of reservoirs and larger reservoirs may use larger pipe. In some implementations, the reservoirs 404a and 404b may be connected to each other by irrigation tubing.

As will be described below, the single row system 400 has a shared water chiller 434 and shared float valve 430. The grow reservoirs 404a and 404b in FIG. 4 also have a shared water pump 422, which is located on the outside of the reservoir in this implementation. In other implementations, the shared water pump 422 may be located on the inside of the reservoir. Water enters the system 400 through the shared float valve 430 and the shared water pump 422 pumps and pulls water to circulate the water in a loop through each of the reservoirs 404a and 404b and through the pipe 452 in the same direction in the system 400 in a closed configuration at a constant rate.

The water is pumped into the grow reservoir 404b through irrigation tubing 432b via an aperture 416a is the same amount of water pulled out of grow reservoir 404b through irrigation tubing 432b via an aperture 416b.

In some implementations, the water pump 422 pulls water directly from the grow reservoir 404a and pumps the water through a water chiller 434 before pumping cooled water back into a different reservoir 404b to push the cooled water through the system 400. The water chiller 434 is optional. In FIG. 4, the water chiller and associated irrigation tubing 432c and 432d is shown for illustration and attaches directly to the water pump 422 and grow reservoir 404.

The water pump 422 can route water from the reservoir 404a to the water pump 422 and from the water pump 422 to the water chiller 434 through irrigation tubing 432c. After the water chiller 434 lowers the temperature of the water, the water chiller 434 can move the water through irrigation tubing 432d to the reservoir 404b. Water can then move through pipe 452 to the reservoir 404a, and then through the water pump and water chiller 434 again, and continue through the hydroponics system 400 in a loop at a constant rate.

In other implementations without the water chiller 434, the water pump and pulls the water from the reservoir 404a and pumps the water directly into the reservoir 404b.

The pipe 452 may be a larger pipe such as a 4" pipe, which helps to negate the need for a separate control reservoir, which is used in systems implementing 2 or 3" pipes. Smaller sizes of pipe/tubing, such as ½", ¾", 1", 2", and 3", have been used in smaller systems because those sizes of pipe/tubing have been more common. A control reservoir may be a separate reservoir which houses several system components and connects system components, including but not limited to, pump timer(s) (which can be used in a flood and drain applications, etc.), float valve(s), nutrient injector (s), reverse osmosis and/or other water filter(s), water chillers, water heaters, etc.

In FIG. 4, the system 400 can include a float valve 430 (as described in detail in FIG. 3) in one grow reservoir 404a to bring water into the system 400, which is a shared component for the entire system 400. In other words, the reservoir 404b may not have a second float valve 430.

The system 400 in FIG. 4 also includes an air pump 420 located on the outside of the grow reservoir 404. The air pump 420 is a shared component in the system and pumps air via aeration tubing 428 into a reservoir(s) (shown here entering into reservoir 404b at aperture 414b and into reservoir 404a at 414a), which pumps oxygen into the water that moves through the system 400.

The hydroponics system 400 also includes a drain out system. The drain out system facilitates water drainage from a side wall (e.g., side wall 410a and side wall 410) or a bottom wall (not shown) of the grow reservoirs 404a and 404b and is made up of several features. The drain out system includes irrigation tubing 432e that is connected to the grow reservoirs 404a and 404b via apertures 416c and 416d, a shut off valve 436, and an adapter 438. An aperture 416c in FIG. 4 is shown on the side wall 410a of reservoir 404a. An aperture 416d in FIG. 4 is shown on the side wall 410b of grow reservoir 404b. Other configurations for a drain out are contemplated. Each row may be connected with connector fittings, such as tees, elbows and a shutoff valve. When the drain out valve is shut off, the water must flow through the apertures of the system. In some implementations, one shut off valve for each row of reservoirs allows for individual rows to be emptied one at a time which is beneficial for larger applications.

The adapter 438 shown in FIG. 4 may be used as a tubing to hose adapter to move water from the grow reservoirs 404a and 404b through a garden hose or other type of hose or tubing (not shown), either by draining or pumping. The adapter 438 may be male or female. For example, the adapter 438 may be a male garden hose to tubing (e.g., ¾', ½", 1", etc.), female garden hose to tubing, or both a male garden hose to tubing and a female garden hose to tubing.

Referring to FIG. 5, an illustration of an example hydroponics system 500 according to the present disclosure is shown. The grow reservoirs 504 are shown in a sectional view to show components that may be located inside the reservoir.

The system 500 shows a double row layout (e.g., two rows 558 and 560), each row with three units or grow reservoirs 504a-f. In the double row layouts, two rows of grow reservoirs 504 may be used, with any number of grow reservoirs. For example, in another implementation, two rows may be used with four grow reservoirs in each row, for a total of eight grow reservoirs in the hydroponics system. In another example, there may be two rows of grow reservoirs, with six grow reservoirs in each row for a total of twelve grow reservoirs. In yet another example, there may be two rows having ten grow reservoirs. The grow reservoir layouts are expandable and configurable.

The grow reservoirs 504a-f have multiple component parts connecting the grow reservoirs 504a-f to each other. For example, the pipe 552a is shown connecting to both grow reservoir 504a and grow reservoir 504b. The pipe 552b is shown connecting to both grow reservoir 504b and grow reservoir 504c. The pipe 552c is shown connecting to both grow reservoir 504c and grow reservoir 504d. The pipe 552d is shown connecting to both grow reservoir 504d and grow reservoir 504e. The pipe 552e is shown connecting to both grow reservoir 504e and grow reservoir 504f. The pipe 552f is shown connecting to both grow reservoir 504f and grow reservoir 504a.

The pipes 552a-f connect to the reservoirs 504a-f with a water-tight seal and can vary in size. The pipes 552a-f shown in FIG. 5 are contemplated to be 4" pipes, however, other sizes are contemplated.

As will be described below, the double row system 500 has a shared water pump 522, a shared water chiller 534, and a shared float valve 530. The shared water pump 522 is located on the outside of the reservoirs 504 in this implementation. The shared water pump 522 pulls and pushes water to circulate the water in a loop in the system 500 in a closed configuration in the same direction between the reservoirs 504a-f at a constant rate. In the implementation in FIG. 5, the water pump 552 directly pulls water from the water pipe 552f and pushes water directly into the pipe 552c through irrigation tubing 532a and 532b.

Specifically, the water can move from the water pump 522 to a pipe 552c to a reservoir 504c then via pipe 552b to reservoir 504b, and then through pipe 552a to reservoir 504a and back to pipe 552f to return to the water pump 522. The water can also move through the other row in the same motion. Specifically, the water can move from the water pump 522 to a pipe 552c to a reservoir 504d then via pipe 552d to reservoir 504e, and then pipe 552e to reservoir 504f and back to pipe 552f to return to the water pump 522. The water continues through the system 500 in a loop at a constant rate. To conserve, energy, a timer can also be used with the water pump to control the length of time to water pump is on and circulating the water through the system.

The water that is pushed travels the same distance as the water that is pulled. Pulling the water from one pipe (e.g., pipe 552f) and pushing it to another pipe (e.g., pipe 552c) allows for the volume of water to be pulled from multiple reservoirs and distributed to multiple reservoirs instead of one reservoir. This movement of the water allows for the difference in water level height to be minimal between the reservoir that the water is being pushed into and the reservoir where the water is being pulled out.

The larger diameter pipe that is used to connect the reservoirs also allows for this difference in water level height to be minimal. The larger diameter pipe, such as a 4" or greater permits more water to flow which keeps the water level height to remain close to constant even for the reservoirs that have the water being pulled out of and the reservoirs that have the water being pushed into. The smaller the pipe that is used to connect larger amounts of reservoirs and larger reservoirs, the greater the difference of the water level that there will be between the reservoirs that have water being pushed into and the reservoirs that have water being pulled out of.

In larger applications, it is beneficial to use larger diameter pipes to connect the different reservoirs for the water level height to remain consistent between the reservoirs that have the water being pulled from the reservoirs and the reservoirs that have the water being pushed into the reservoirs. The water pumped into a first pipe (e.g., pipe 552c) from the water pump 522 is the same amount of water pulled out of a second pipe (e.g., pipe 5520). For example, all the water traveling through the pipes 552a-f and reservoirs 504a-f travels the same distance. Different configurations of rows with various amounts of reservoirs can be put together with growing reservoirs (reservoirs with lids that have apertures for plants). If a vertical system is desired and/or a system that uses rolling rows to eliminate aisles and increase the growing space, then the different growing rows can be connected together using control reservoirs (e.g., FIGS. 8-14).

In some implementations, the water pump 522 pumps and pulls water directly into reservoirs 504. In some implementations, the water pump 522 pulls water directly from a pipe 552f and through a shared water chiller 534. The water pump 522 routes water from pipe 552f to the water chiller 534 via a first irrigation tubing, and after the water chiller 534 lowers the temperature of the water, the water chiller 534 can move the water via a second irrigation tubing to the pipe 552c. In some implementations, the chilled water can be moved directly into a reservoir. In FIG. 5, the system 500 can include a float valve 530 in one grow reservoir (e.g., grow reservoir 504f), by way of example, and is a shared component for the entire hydroponics system 500. In other words, the grow reservoirs 504a-e do not necessarily require additional float valves. In other implementations, there may be multiple float valves.

The system 500 in FIG. 5 also includes an air pump 520 located on the outside of the grow reservoir 504d. In some implementations, the air pump 520 may be located inside the grow reservoir 504 (see, e.g., FIG. 3). The air pump 520 is a shared component in the system and pumps air via aeration tubing 528 into a grow reservoir, which pumps oxygen into the water that moves through the grow reservoirs 504a-f in the system 500. The aeration tubing 528 may be various sizes, such as 3/16", 1/4", 3/8", etc. and is connected to each grow reservoir via an aperture (e.g., aperture 514).

A shared drain out system for the rows 558 and 560 of reservoirs 504 a-f in the hydroponics system 500 is shown. The shared drain out system includes irrigation tubing 532c connecting to the grow reservoirs 504a-f via an aperture (e.g., aperture 516) in sidewalls of the reservoirs 504a-f, a shut off valve 536, and an adapter 538 to facilitate water drainage from a side or a bottom wall of the reservoirs 504a-f. The irrigation tubing 532c is shown connected to all the reservoirs 504a-f. Other configurations for a drain out system are contemplated. For example, some systems may have a drain out system for each row of grow reservoirs.

The adapter 538 shown in FIG. 5 may be used as a tubing to hose adapter to move water from the reservoirs 504a-f through a garden hose or other type of hose or tubing, either by draining or pumping. The adapter 538 may be male or female. For example, the adapter 538 may be a male garden hose to tubing (e.g., 3/4', 1/2", 1", etc.), female garden hose to tubing, or both a male garden hose to tubing and a female garden hose to tubing.

Figure 6A:
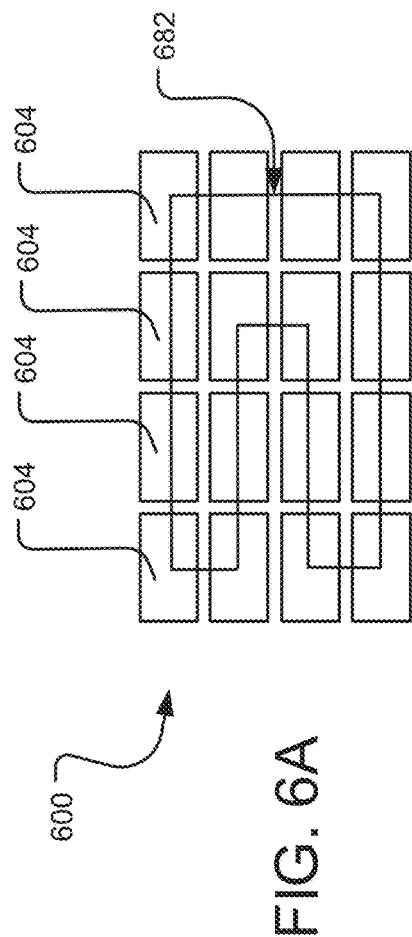
FIGS. 6A and 6B are illustrations of an example hydroponics system according to the present disclosure.
Figure 6B:
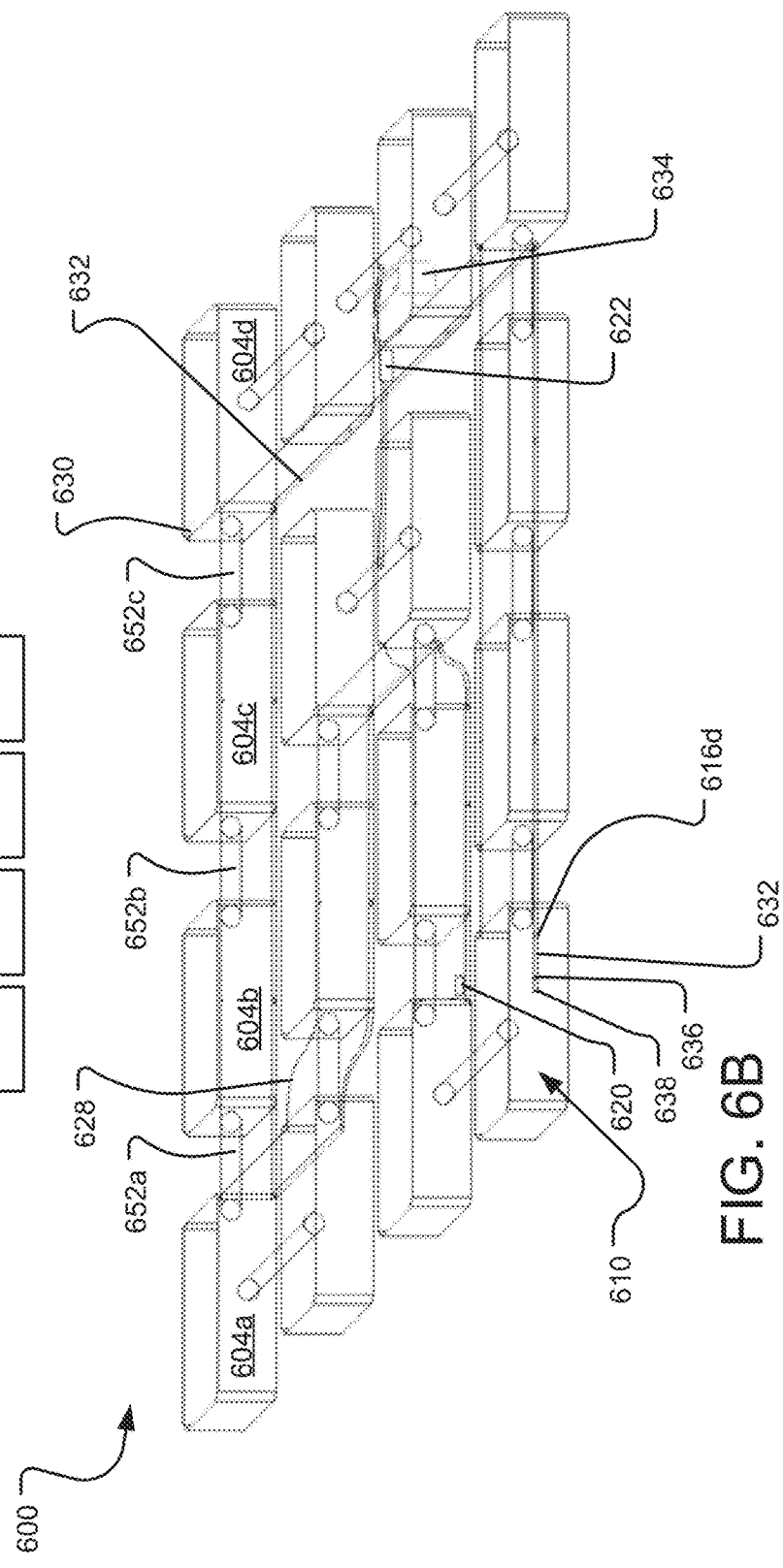

Referring to FIGS. 6A and 6B, illustrations of example hydroponics system 600 according to the present disclosure are shown. FIG. 6A is a top view of the hydroponics system 600. FIG. 6B is a perspective view of the hydroponics system 600. The grow reservoirs 604 are shown in FIG. 6B in a sectional view to show that components may be located inside the grow reservoir. The hydroponics system 600 shows a multi-row system, including four rows, each row with four units or grow reservoirs 604. The system 600 has the same component parts as the system 500 shown in FIG. 5, in a larger scale. In the multi-row systems, any number of rows and units of grow reservoirs 604 may be used. For example, in another implementation, four rows may be used with four grow reservoirs in each row, for a total of sixteen grow reservoirs in the hydroponics system. In another example, there may be five rows of grow reservoirs, with three grow reservoirs in each row for a total of fifteen grow reservoirs. In yet another example, there may be seven rows, with three rows having three grow reservoirs and four rows having only two grow reservoirs. The grow reservoir layouts are expandable and configurable.

Referring to FIG. 6A, the grow reservoirs 604 have multiple component parts connecting the grow reservoirs 604 to each other. These component parts are illustrated in FIG. 6A by a connectivity line 682. Such connectivity may include, for example, a plurality of pipes 652, each pipe connecting two grow reservoirs 604 (e.g., pipe 652a connects grow reservoir 604a to grow reservoir 604b, pipe 652b connects grow reservoir 604b to grow reservoir 604c, and pipe 652c connects grow reservoir 604c to grow reservoir 604d), as shown in FIG. 6B. Water moves through the grow reservoirs 604 and pipes 652 in the hydroponics system 600 through the path of the connectivity line 682.

Similar to other examples in this disclosure, the multi-row system 600 may optionally include a shared water pump 622, a shared water chiller 634, and a shared float valve 630. The shared water pump 622 is located on the outside of the reservoirs 604 in this implementation. The shared water pump 622 circulates the water in a loop in the system 600 in a closed configuration between the reservoirs 604 at a constant rate. The water pumped into a first pipe from the water pump 622 is the same amount of water pulled out of a second pipe. For example, all the water traveling through the pipes 652 and grow reservoirs 604 travels the same distance. The pipes 652 may be 4" pipes, which helps to negate the need for a separate control reservoir, which is used in other hydroponic systems.

In FIG. 6B, the hydroponics system 600 may include a shared float valve 630 in only one reservoir 604d for the entire hydroponics system 600.

The hydroponics system 600 in FIG. 6A also may include a shared air pump 620 located on the outside of the reservoirs 604. In some implementations, the air pump 620 may be located inside the reservoir 604. The air pump 620 is a shared component in the system and pumps air via shared aeration tubing 628 connected to each reservoir 604. The air pump 620 pumps oxygen into the water that moves through the reservoirs 604 in the hydroponics system 600.

A shared drain out system in the hydroponics system 600 is shown. The shared drain out system includes irrigation tubing 632 connecting to reservoirs 604 via apertures (e.g., aperture 616*d*), a shut off valve 636, and an adapter 638 to facilitate water drainage from a side or a bottom wall of the reservoirs 604. Other configurations for a drain out system are contemplated. The adapter 638 shown in FIG. 6B may be used as a tubing to hose adapter to move water from the reservoirs 604 through a garden hose or other type of hose or tubing, either by draining or pumping. The adapter 638 may be male or female. For example, the adapter 638 may be a male garden hose to tubing (e.g., ¾', ½", 1", etc.), female garden hose to tubing, or both a male garden hose to tubing and a female garden hose to tubing.

Figure 7:
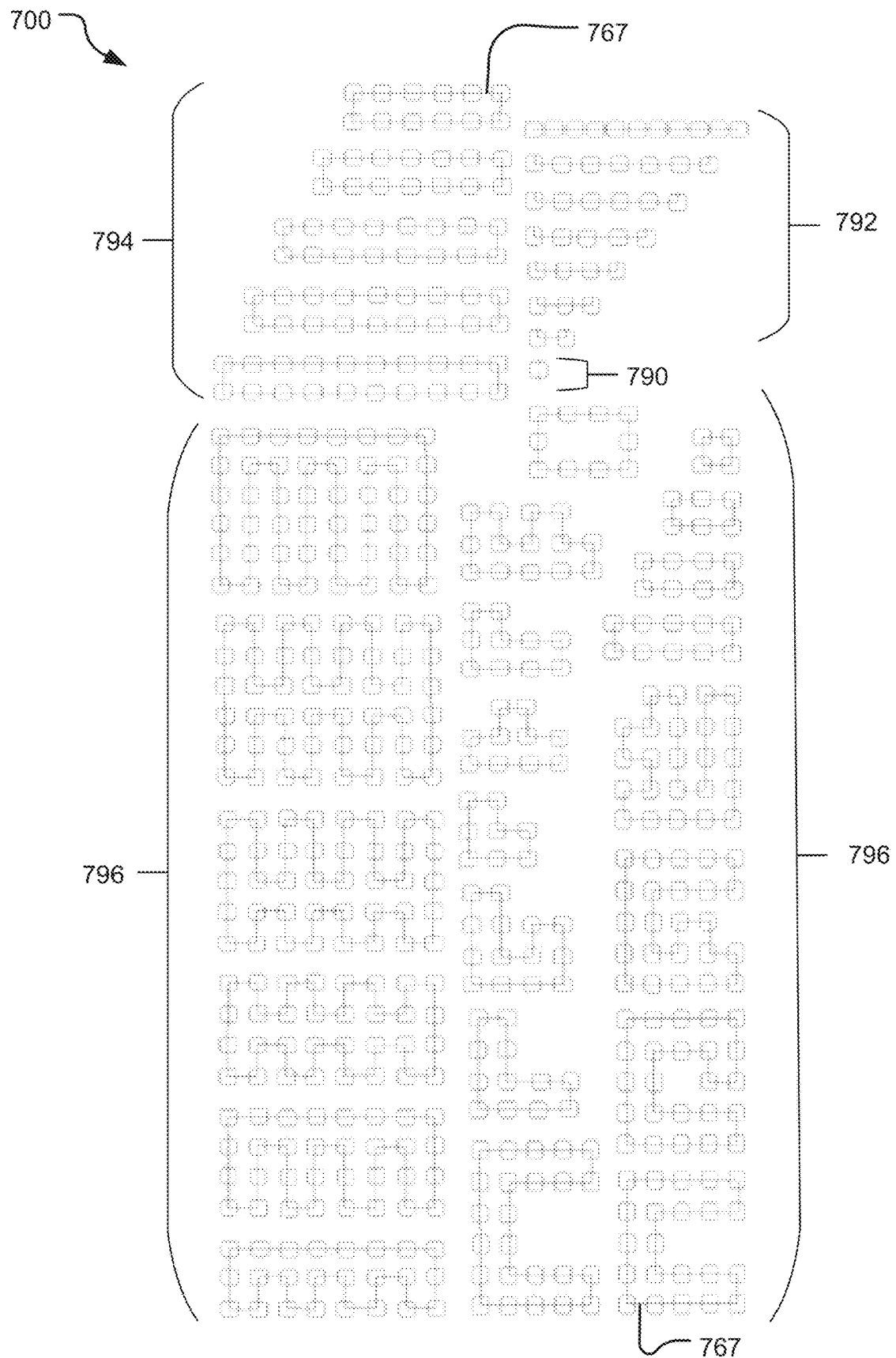
FIG. 7 is an illustration of example hydroponics systems according to the present disclosure.

FIG. 7 illustrates example hydroponic systems 700. As shown and described in the examples herein, the grow reservoirs 704 in the hydroponic systems may be configured in various arrangements in one or both vertical and horizontal layouts. In FIG. 7, top views of reservoirs are shown as connected in horizontal layouts. The reservoirs 704 may be configured as a single unit (e.g., reservoir 790), in a single row layout (e.g., reservoirs 792), in double row layouts (e.g., reservoirs 794), and in multiple row layouts (e.g., reservoirs 796). Any number of layouts may be configured by positioning the reservoirs in desired locations. The multi-row layouts can include the double row layouts, and some double layouts and multi-row layouts are rolling layouts, where each row is movable and can move independently from other rows.

The reservoirs 704 may be configured to connect to each other via shared piping, tubing, and/or other components, and the components of attachment may be in located in various arrangements in any given hydroponic system 700. For example, if reservoirs 704 are connected via piping, there may be one pipe located between and connecting two reservoirs. In the same or a different example, there may be aeration tubing connected to one or more reservoirs. In the same or a different example, there may be a drain out system connected to one or more reservoirs.

A connectivity line 767 is shown to illustrate the connectivity of the reservoirs to each other in the closed configuration of reservoirs 704. The connectivity line 767 represents various components connecting the reservoirs, such as the shared water or air sources for constant water flow or aeration (e.g., pipes, tubing) or other shared components between the reservoirs 704 in a system 700.

Figure 8:
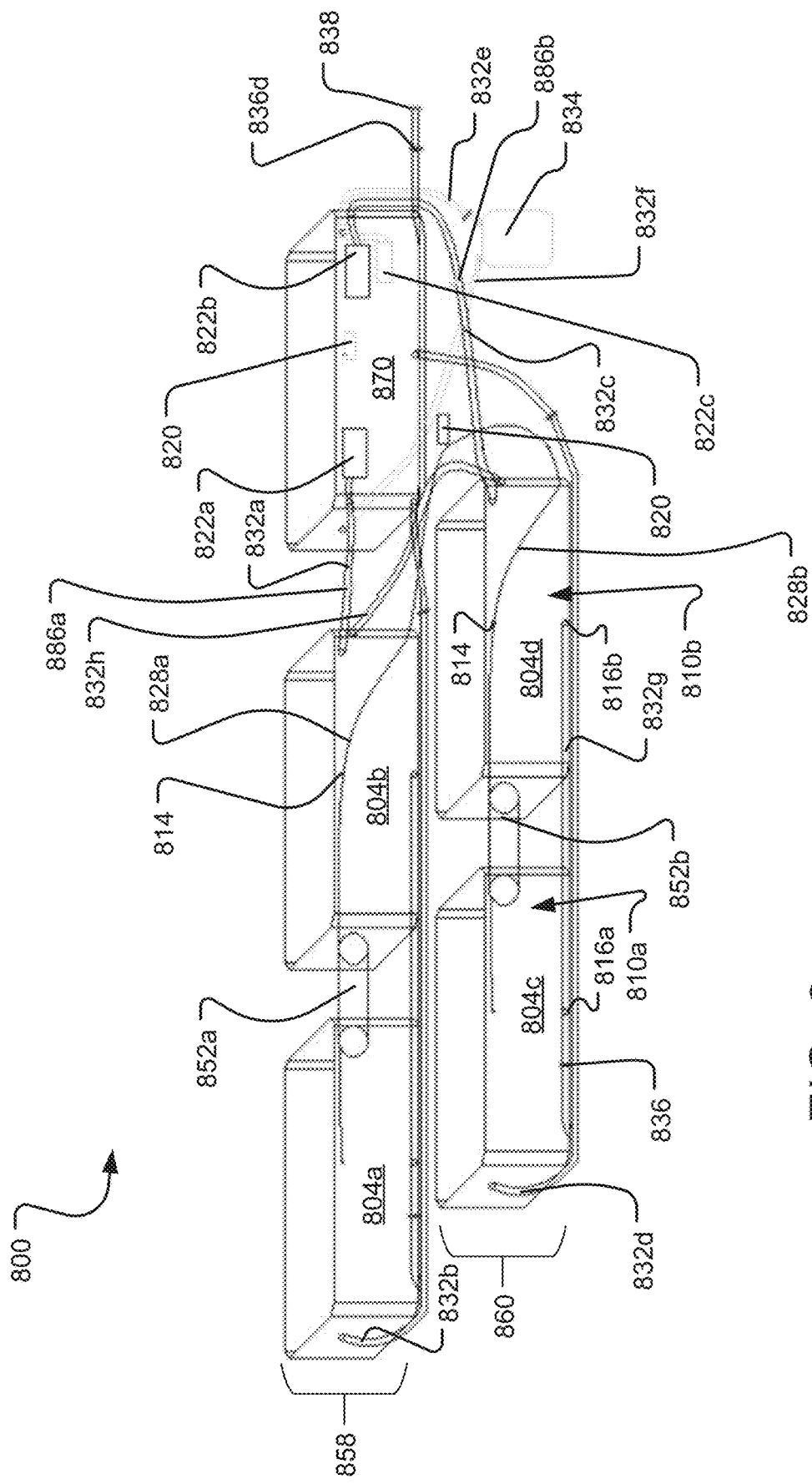
FIG. 8 is an illustration of an example hydroponics system according to the present disclosure.

Referring to FIG. 8, an illustration of an example hydroponics system 800 according to the present disclosure is shown. The grow reservoirs 804 and a control reservoir 870 are shown in a sectional view to show that components may be located inside the reservoir. The system 800 shows that the reservoirs 804*a-d* may be configured in rolling double rows (e.g. row 858 and row 860), using as many units in each of the rows as desired, to eliminate and open aisles in a grow facility. The term "rolling" refers to the movability of the rows. Each row may be moved independent from another row. For example, the units or reservoirs 804*a* and 804*b* are connected to each other (e.g., by pipe 852*a*), or reservoirs 804*c* and 804*d* are connected to each other (e.g., by pipe 852*b*), and may be placed on wheels in order to be manually moved together by a user in a grow facility. Other methods of moving the reservoirs are contemplated (e.g., the rows may be electronically moved on platforms).

The movability of the system 800 is configured to account for the fact that 4" pipes do not have flexibility in a rolling system. For example, 4" pipes may be implemented in a row 858 of reservoirs 804*a* and 804*b*, where the reservoirs can be moved together on one platform with wheels. However, if a row 860 of reservoirs 804*c* and 804*d* are on a separate platform on wheels, the reservoirs 804*c* and 804*d* in row 860 cannot be connected to the reservoirs 804*a* and 804*b* by 4" pipes. Therefore, a control reservoir 870 is incorporated into the system 800 to house certain system components (e.g., the water pumps 822*a* and 822*b*, a float valve 830). The control reservoir 870 is shown connected to each of the double rolling rows 858 and 860 via irrigation tubing 832 and may be moved separately on its own platform from the reservoirs in rows 858 and 860.

In the implementation shown in FIG. 8, there are three water pumps 822*a*, 822*b*, and 822*c* in the control reservoir 870. There is one pump to pump water to each of the double rows (e.g., a water pump 822*a* for row 858 and a water pump 822*b* for row 860) or grow reservoirs, and one water pump 822*c* solely to pump water to the water chiller.

As shown, the reservoirs 804*a* and 804*b* in each of the rows 858 and 860 are connected to each other by pipes 852*a* and 852*b* to provide for water flow through the reservoirs. The pipes 852*a* and 852*b* are contemplated to be 4" pipes, which however, other sizes are contemplated.

An overflow tubing 832*h* is connected to each row 858 and 860 at the top of grow reservoirs 804*b* and 804*d* at a predetermined water level. The overflow tubing 832*h* may be ¾", 1", etc. A filter or screen (not shown) may be located at the entrance of the overflow tubing 832*h*, and a tee fitting (not shown) connects the overflow tubing 832*h* to the control reservoir 870.

As shown, the water pump 822*a* is a shared water pump for reservoirs 804*a* and 804*b* in row 858 and the water pump 822*b* is a shared water pump for reservoirs 804*c* and 804*d* in row 860. Each of the shared water pumps 822*a* and 822*b* pumps (via irrigation tubing 832*a* and 832*c*, respectively) and pulls water (via irrigation tubing 832*b* and 832*d*, respectively) to circulate the water in a loop for each respective row of reservoirs in a closed configuration between the reservoirs at a constant rate. In some implementations in the various systems, as shown in FIG. 8, feed tubing 832*a* and 832*c* contains a check valve 886*a* and 886*b* or similar device to prevent debris from flowing backwards into the water pumps 822*a* and 822*b*.

In the implementation in the double rolling rows shown in system 800, the water pump 822*a* pumps water through irrigation tubing 832*a* from the control reservoir 870 to the reservoir 804*b*, through the pipe 852*a*, to the reservoir 804*a*, and through irrigation tubing 832*b* back to the control reservoir 870. The water pumped into the first reservoir 804*b* from the water pump 822*a* is the same amount of water pushed out of the reservoir 804*a* via irrigation tubing. All the water traveling through each row typically travels the same distance as the other rows and is constantly mixing with the water in all rows as the water returns to the control reservoir and is pumped out again into another random row.

Similarly, the water pump 822*b* pumps water through irrigation tubing 832*c* from the control reservoir 870 to the reservoir 804*d*, through the pipe 852*b*, to the reservoir 804*c*, and through irrigation tubing 832*d* back to the control reservoir 870. The water pumped into the reservoir 804*c* from the water pump 822*b* is the same amount of water pulled out of the reservoir 804*c* via irrigation tubing. For example, all the water traveling through the pipe 852*b* and reservoirs 804*c* and 804*d* travels the same distance.

In the implementation shown in FIG. 8, the temperature of the water in the control reservoir 870 (and ultimately, the entire system 800) may be lowered in a water chiller 834. The water moves from the control reservoir 870 via the water pump 822*c* and an irrigation tubing 832*e* to the water chiller 834. After the water chiller 834 lowers the temperature of the water, the water chiller 834 can move the water back through irrigation tubing 832*f* to the control reservoir 870. The water can then move from control reservoir 870 to the rows 858 and 860 by the water pumps 822*a* and 822*b* in a loop at a constant rate.

The system 800 in FIG. 8 also includes an air pump 820 located on the outside of the reservoir 804. In some implementations, the air pump 820 may be located inside the reservoir 804. The air pump 820 is a shared component in the system and pumps air via multiple aeration tubings 828*a* and 828*b* into the reservoirs 804*a-b* and 804*c-d*, respectively, which pumps oxygen into the water that moves through the system 800. In other implementations, there is only one shared irrigation tubing for the system.

In the implementation shown in FIG. 8, the drain out system of the hydroponics system 800 may be performed row by row (as shown and described in FIG. 4) or even unit by unit in some implementations, as the drain out of each row does not need to be performed at the same time. In cases where a double rolling row system has a large number of reservoirs 804 in each row, it may not be feasible to perform a drain out of every row at the same time or day. Therefore, this implementation may include multiple drain out system capabilities per row. In FIG. 8, there is one drain out system per each row (e.g., water can be drained out from a side or a bottom wall (e.g., side wall 810*a* of reservoirs 804*c* and side wall 810*b* of reservoir 804*d* through apertures 816*a* on reservoir 804*c* and aperture 816*b* on reservoir 804*d* for row 860 through irrigation tubing 832*g*. The drain out system may include shut off valves and adapters (e.g., adapter 838) to facilitate water drainage from the irrigation tubing 832*d* and through the control reservoir 870 and the shut off valve 836*d*. Other configurations for a drain out system are contemplated.

In other implementations, there may be additional control reservoirs added to the system 800 as the number of units or grow reservoirs 804 increase. The control reservoirs in the disclosed systems may be moved in different configurations, as desired. For example, in some implementations, two control reservoirs may be included in a double row system. Each control reservoir may be each located at the end of or adjacent to each row, or both control reservoirs may be located in the same row, or the control reservoirs may be located over or underneath the one or two rows of grow reservoirs in a vertical layout. More or larger control reservoirs are needed in a system when expanding the number of grow reservoirs in the rolling rows or vertical rows of any given system. In some implementations, when there is a larger amount of grow reservoirs, the control reservoirs can be made larger or more control reservoirs can be linked together underneath each row or in other horizontal or vertical configurations in a separate location away from but connected to the grow reservoir configurations.

Figure 9A:
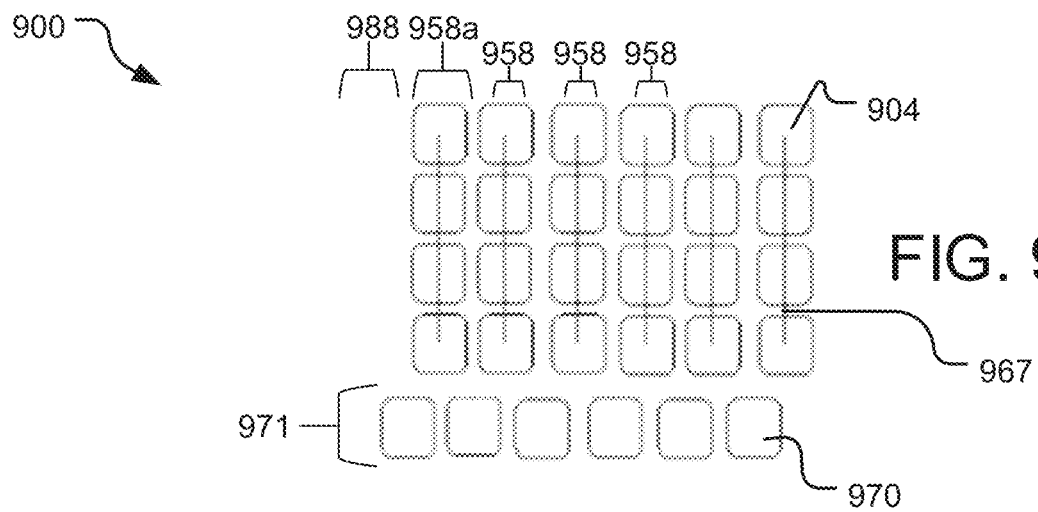
FIGS. 9A-C are illustrations of example hydroponics systems according to the present disclosure.
Figure 9B:
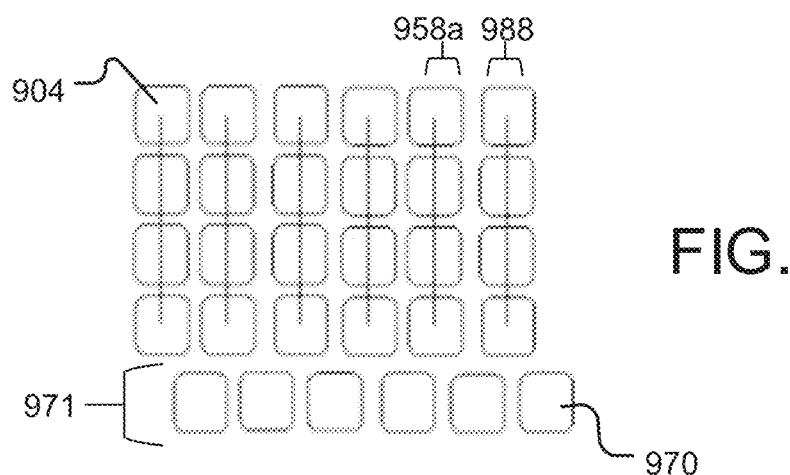
Figure 9C:
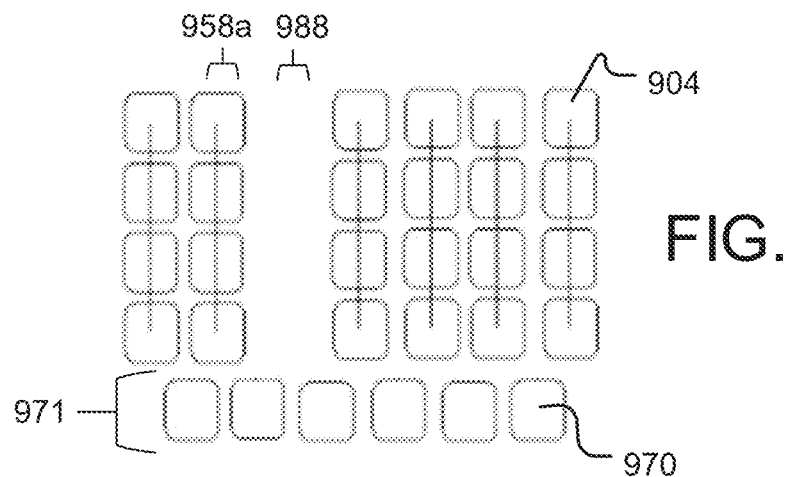

FIGS. 9A-C are illustrations of top views of grow reservoirs 904 and control reservoirs 970 in example hydroponics systems 900 according to the present disclosure. The control reservoirs 970 are configured in a single horizontal row 971 and positioned in proximity to "rolling" rows 958 of the reservoirs 904 in FIGS. 9A-C. The control reservoirs 970 may be configured and arranged in various layouts to connect to each row 958 of reservoirs in the hydroponics systems 900. For example, each control reservoir 970 may have a water pump that is accessible to each corresponding row 958 of reservoirs via irrigation tubing in closest proximity to each control reservoir 970.

In some implementations, there may be any number of horizontal multiple rows of reservoirs, and there may or may not be control reservoirs incorporated into a hydroponics system 900.

A connectivity line 967 is shown to illustrate the connectivity of the grow reservoirs to each other in each row in the closed configuration of reservoirs 904. The connectivity line 967 represents components connecting the reservoirs, such as the shared water or air sources for constant water flow or aeration (e.g., pipes, tubing) or other shared components between the reservoirs 904 in a system 900. Each individual row can be connected to a control reservoir in a configuration where the control reservoir is located in a separate area from but connected to the grow reservoirs as shown in FIGS. 9A-C, or in a configuration where the control reservoirs may be located underneath a row of grow reservoirs (as shown in FIG. 14). The individual rows of growing reservoirs 904 can be moved back and forth in unison for a set distance (e.g., 4') to create an aisle space wherever needed which can eliminate all of the aisles but one. As a result, creating aisle space only where needed significantly increases the total growing space. In the reservoir configuration shown in FIGS. 9A-C, the control reservoirs 970 may be connected to the rows of reservoirs and located in a separate area away from the grow reservoirs. In other implementations, the control reservoirs 970 may be located closer to the rows of reservoirs, and in some cases, located above, in, or under the rows of grow reservoirs.

The rows 958 in FIGS. 9A-C show rolling rows of reservoirs 904. The reservoirs 904 in each row 958 are connected to each other, for example, on a platform on wheels, and not directly connected to the reservoirs 904 in any adjacent rows. Each rolling row 958 of reservoirs 904 may be moved independently from the other rows 958 to alleviate the need for aisles between every single row 958 of reservoirs in the hydroponics system 900. By eliminating aisles in between every row 958, when a user needs access to each row 958, the user moves the rolling rows 958 to require only one aisle 988 adjacent to one row 958 of reservoirs 904.

FIGS. 9A-C show three examples of how rows 958 may be moved. For example, in FIG. 9A, when a user needs to access row 958*a*, for example, the user can move all the rows 958, including 958*a*, adjacent to one another, and make an aisle 988 for the user to walk down and access each reservoir 904 and its components in row 958*a*.

For example, in FIG. 9B, when a user needs to access row 958*a*, for example, the user can move all the rows 958, including 958*a*, adjacent to one another, and make an aisle 988 for the user to walk down and access each reservoir 904 and its components in in row 958*a*.

For example, in FIG. 9C, when a user needs to access row 958*a*, for example, the user can split the rows 958, including 958*a*, into two groups adjacent to one another, and make an aisle 988 in the center of all of the hydroponics system 900 for the user to walk down and access each reservoir 904 and its components in row 958*a*.

Figure 10:
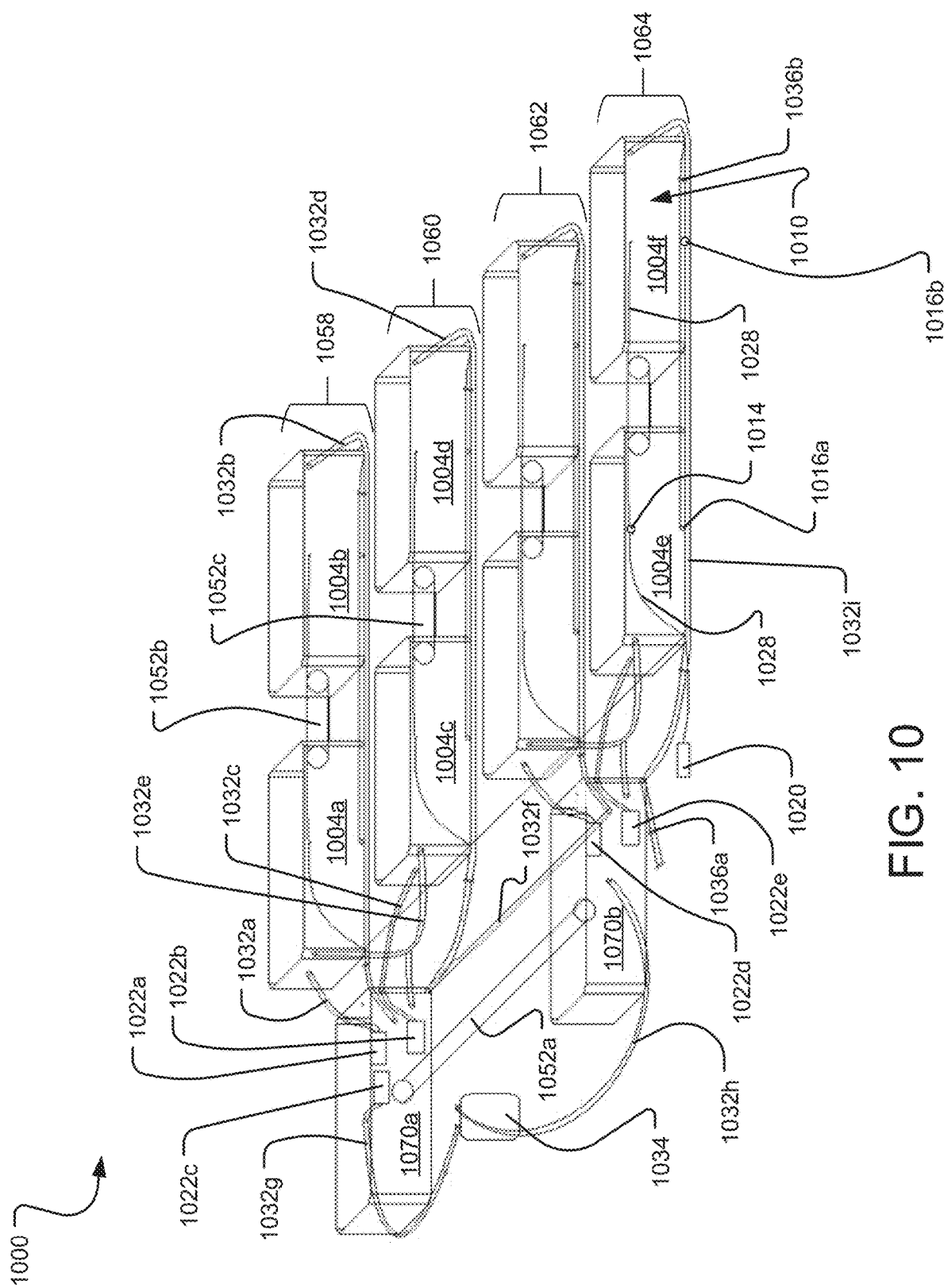
FIG. 10 is an illustration of an example hydroponics system according to the present disclosure.

FIG. 10 is an illustration of an example hydroponics system 1000 according to the present disclosure. Multiple grow reservoirs 1004 and control reservoirs 1070 are shown in a sectional view to show that components may be located inside the reservoir.

The system 1000 shows that the grow reservoirs 1004 may be configured in multiple "rolling" horizontal rows, as shown in FIGS. 9A-C, using as many units as desired, to eliminate and open aisles in a grow facility. The system 1000 is "rolling" in that the units or grow reservoirs 1004 may be placed on wheels in order for each row to be moved together in a grow facility. The system 1000 is configured to account for the fact that 4" pipes do not have flexibility in a rolling system. For example, a 4" solid pipe 1052*b* may be implemented in a row 1058 of reservoirs 1004*a* and 1004*b*, where the reservoirs can be moved together on one platform with wheels. However, if a row 1060 is on a separate platform on wheels, the reservoirs in row 1058 cannot be connected to the reservoirs in row 1060 by 4" pipes. Therefore, at least one control reservoir (e.g., control reservoir 1070*a*) may be incorporated into the system 1000 to house certain system components to provide shared components for multiple rolling rows of reservoirs. For example, in some implementations, it may be advantageous to have one control reservoir 1070 per every four grow reservoirs 1004. In system 1000, because there are eight grow reservoirs in the system 1000, two control reservoirs 1070*a* and 1070*b* are added. Additional control reservoirs and grow reservoirs may be incorporated into the system 1000.

The disclosed configurations eliminate aisle space in the system 1000. Where other systems may require an aisle between each row, in system 1000, the rows on wheels may be moved closer together and aisle space may be reduced to as low as one aisle, where the rows can be moved together to allow a user to walk down one aisle in between the rows for working on the reservoirs. For example, if a user needs access to the second row 1060, the user can move the rows on wheels to create an aisle space in between rows 1058 and 1060. If the user only needs access to row 1058, the user can move row 1058 close to row 1060 and access row 1058 from the other side. By eliminating aisles, there is more growing space in a facility, and because of the extra space for more rows of reservoirs.

In the implementation in FIG. 10, the control reservoirs 1070*a* and 1070*b* are connected to four double rolling rows (by way of example) via irrigation tubing 1032. The control reservoirs 1070*a* and 1070*b*, connected via pipe 1052*a* may be moved separately from the rows 1058, 1060, 1062, and 1064 of the grow reservoirs.

As shown in FIG. 10, the control reservoirs 1070*a* and 1070*b* are connected to each other by pipe 1052*a*. In other implementations, the control reservoirs may be connected to each other by irrigation tubing.

In other implementations, more reservoirs may be added or removed. In implementations where the system 1000 is scaled up with additional reservoirs 1004, additional control reservoirs 1070 may be needed. For example, in a system which includes eight rows with eight reservoirs in each row (a total of 64 reservoirs), 16 control reservoirs may be required. In some implementations, instead of adding more control reservoirs to increase the volume of water to correlate with the extra grow reservoirs, larger control reservoirs can be used, control reservoirs. The reservoirs 1004 in the rows may connect to one another by pipes, and the control reservoirs 1070 may connect to one another by pipes, and the reservoirs 1004 may connect to the control reservoirs 1070 by irrigation tubing. The use of irrigation tubing in between the control reservoirs 1070 and the reservoirs 1004 allows mobility of each row, which may be on wheels, so that each row can be moved.

In the implementation shown in FIG. 10, there are multiple water pumps in the control reservoirs 1070*a* and 1070*b*. There may be more than one shared water pump to maintain the water level height in the reservoirs throughout the system. The water pumps 1022*a* and 1022*b* in control reservoir 1070*a* pump water for each of the rolling rows 1058 and 1060, respectively. The water pumps 1022*d* and 1022*e* in control reservoir 1070*b* pump water for each of the rolling rows 1062 and 1064, respectively. There is a water pump 1022*c* in control reservoir 1070*a* to pump water from the control reservoirs 1070*a* to the water chiller 1034 and to the control reservoir 1070*b*.

As shown, the reservoirs 1004 (e.g., reservoirs 1004*a* and 1004*b*) in each of the rows (e.g. row 1058) are connected to each other by pipes (e.g., pipe 1052*b*) to provide for water flow through the reservoirs from and to each of the row's respective water pumps. The pipes 1052*b* are contemplated to be 4" pipes, which however, other sizes are contemplated.

As shown, the shared water pump 1022*a* is a shared water pump for reservoirs 1004*a* and 1004*b* in row 1058. The shared water pump 1022*a* pumps and pulls water to circulate the water in a loop in a closed configuration between the reservoirs 1004*a* and 1004*b* at a constant rate. This water flow is the same as the water flow in other rolling rows (e.g., rows 1060, 1062, and 1064) in the system 1000, and in other similar figures (e.g., FIG. 8).

In the implementation in the rolling rows shown in system 1000, the water pump 1022*a* pumps water through irrigation tubing 1032*a* from the control reservoir 1070*a* to the reservoir 1004*a*. Water then moves through the pipe 1052*b*, to the reservoir 1004*b*, and through irrigation tubing 1032*b* back to the control reservoir 1070*a*. The water pumped into the first reservoir 1004*a* from the water pump 1022*a* is substantially the same amount of water pulled out of the reservoir 1004*b* via irrigation tubing 1032*b*. All the water in row 1058 that is traveling through the pipe 1052*b* and reservoirs 1004*a* and 1004*b* can travel the same distance as the water in the other rows 1060, 1062, 1064.

For example, the water pump 1022*b* pumps water through irrigation tubing 1032*c* from the control reservoir 1070*a* to the reservoir 1004*c*. Water then moves through the pipe 1052*c*, to the reservoir 1004*d*, and through irrigation tubing 1032*d* back to the control reservoir 1070*a*. The water pumped into the reservoir 1004*c* from the water pump 1022*c* is substantially the same amount of water pulled out of the reservoir 1004*d* via irrigation tubing 1032*d*. For example, substantially all the water traveling through the pipe 1052*c* and reservoirs 1004*c* and 1004*d* travels substantially the same distance. Similarly, the water flow from water pumps 1022*d* and 1022*e* pump water from the control reservoir 1070*b* to the reservoirs 1004 in rows 1062 and 1064 similarly to the water pumps 1022*b* and 1022*c*.

In FIG. 10, there is a float valve shown in control reservoir 1070*b*. In some implementations, there may be a shared float valve in one or more reservoirs. In other implementations, there may not be a shared float valve in one or more reservoirs.

An overflow irrigation tubing 1032*e* is connected to reservoirs 1004*a* and 1004*c* and prevents the water level in the growing reservoirs 1004*a-d* from getting too high and will drain the water back to the control reservoir 1070*a*. There may be a screen located at the entrance of the overflow tubing 1032*e* to filter out any debris as the water exits the reservoir into the overflow tubing. The overflow tubing from multiple reservoirs can be combined with a connector fitting as the excess water returns back to the control reservoir.

The irrigation tubing 1032*f* connects the bottom of the control reservoirs and is part of a drain out system where the system 1000 can be drained out from multiple rows of reservoirs at one time. FIG. 10 also shows that one reservoir or row of reservoirs (e.g., row 1064) may be drained individually (e.g., valve 1036b and a tubing to hose adapter (not shown) located in the irrigation tubing).

In the implementation shown in FIG. 10, the drain out system of the hydroponics system 1000 may also be performed row by row (as shown and described in FIG. 4) as the drain out of each row does not need to be performed at the same time. In cases where a rolling row system has a large number of reservoirs 1004 in each row, it may not be feasible to perform a drain out of every row at the same time or day. Therefore, this implementation may include multiple drain out system capabilities per row. In FIG. 10, there is one drain out system per each row (e.g., water can be drained out from a side or a bottom wall (e.g., side wall 1010 of a reservoirs 1004e and 1004e through apertures 1016a and 1016b, by example, in row 1064) through irrigation tubing 1032i. The drain out system may include a shut off valve and tubing to hose adapters located in tubing 1032i to facilitate water drainage from the irrigation tubing 1032i. When the tubing to hose adapters are connected, water can circulate through the system continuously. When the hose to tubing adapters are disconnected, another hose or tubing can be connected to completely drain the water out of the row. Other configurations for a drain out system are contemplated.

In the implementation shown in FIG. 10, the temperature of the water in the control reservoirs 1070a and 1070b may be lowered in a water chiller 1034. The water moves from the control reservoirs 1070 via an irrigation tubing 1032g to the water chiller 1034. After the water chiller 1034 lowers the temperature of the water, the water chiller 1034 can move the water through irrigation tubing 1032h to the control reservoir 1070b. The water can then move from control reservoir 1070b to the rows 1062 and 1064 by the water pumps 1022d and 1022e in a loop at a constant rate.

The system 1000 in FIG. 10 also includes an air pump 1020 located on the outside of the reservoirs 1004. The air pump 1020 is a shared component in the system and pumps air via aeration tubing 1028 into the reservoirs 1004 which pumps oxygen into the water that moves through the system 1000.

Referring to FIG. 11, an illustration of an example hydroponics system 1100 according to the present disclosure is shown. The grow reservoirs 1104a-d and a control reservoir 1170 are shown in a sectional view to show that components may be located inside the reservoir. The system 1100 shows that the reservoirs 1104a-d may be configured in a vertical layout. The vertical layouts may include using as many units as desired, to create space and eliminate open aisles in a grow facility. In some implementations, the vertical layout may be rolling rows on wheels. In some implementations, the vertical layouts may be combined with horizontal layouts (shown and described in FIG. 12).

In the hydroponics system 1100 shown in FIG. 11, a control reservoir 1170 is located at the bottom of the hydroponics system 1100. The control reservoir 1170 is shown to support four reservoirs 1104a-d with several shared components (e.g., a shared water pump 1122, a shared float valve 1130, etc.). A shared air pump 1120 is positioned outside the reservoirs and aeration tubing 1128 delivers air to each of the reservoirs 1104a-d. A water pump 1122b is located in the control reservoir 1170 to pump water to an optional shared water chiller 1134 located outside the control reservoir 1170 to lower the temperature of the water. In some implementations, the hydroponics system 1100 may not include a water chiller 1134.

As shown in this implementation, one control reservoir 1170 may be used for up to four reservoirs. Additional or larger control reservoirs may be used if there are more than four reservoirs in a system. However, depending on the configuration of the system components, more or less control reservoirs may be used.

As shown in FIG. 11, a water pump 1122a pumps water from the control reservoir 1170 to grow reservoir 1104a via irrigation tubing 1132a to circulate water from the water pump 1122a from the control reservoir 1170 to the four reservoirs 1104a-d and back to the control reservoir 1170. The water flow moves from the irrigation tubing 1132a to the reservoir 1104a through irrigation tubing 1132b to the reservoir 1104b through irrigation tubing 1132c, to the reservoir 1104c through irrigation tubing 1132d, to the reservoir 1104d through irrigation tubing 1132e to the control reservoir 1170.

Each of the growing reservoirs 1104a-d has a total drain out tube 1190 with a shut off valve 1136a (shown for all reservoirs 1104a-d and labeled for reservoir 1104a) that is connected to irrigation tubing (e.g., irrigation tubing 1132b). When the shut off valve 1136a is opened, the reservoir (e.g., reservoir 1104a) can drain completely into a reservoir (e.g., reservoir 1104b) below it.

As shown in FIG. 11, the control reservoir 1170 may have a drain out system and can empty all of the water out of the system completely. Water can be drained out from a side or a bottom wall (e.g., side wall 1110 of control reservoir 1070 through apertures 1016b) through irrigation tubing 1032g. The drain out system in the control reservoir 1070b may include a shut off valve 1136b and an adapter to facilitate water drainage from the irrigation tubing 1032g. Other configurations for a drain out system are contemplated. For example, in a vertical layout that also incorporates a horizontal layout, there may be drain out systems that are shared across a row of reservoirs and down a vertical column of reservoirs.

Also, each growing reservoir 1104a-d has an overflow exit 1192 (shown for each reservoir 1104a-d, and labeled for reservoir 1104a) that starts with a filter or screen at the top of the water level in each reservoir, and fittings connected the overflow tubing as the excess water drains from all of the growing reservoirs and into the control reservoir 1170 on the lowest level via irrigation tubing 1132f.

Referring to FIG. 12, a combination of vertical and horizontal layouts of grow reservoirs 1204 are implemented in a hydroponics system 1200. The reservoirs 1204 and control reservoirs 1270 are shown in a sectional view to show that components may be located inside the reservoir. In some implementations, systems 1200 with vertical and horizontal layouts may include rolling rows of reservoirs.

In FIG. 12, a row 1258 of four grow reservoirs 1204 are located over a row 1260 of four grow reservoirs 1204, which are located over a row 1262 of controls reservoirs 1270. In some implementations, the system 1200 may include lights or hoods 1256 over the reservoirs 1204.

As shown, the grow reservoirs 1204 of row 1258 are connected to each other by three pipes 1252a, the grow reservoirs 1204 of row 1260 are connected to each other by three pipes 1252b, and the control reservoirs 1270 of row 1262 are connected to each other by one pipe 1252c. The grow reservoirs 1204 and the control reservoirs 1270 are connected to each other by irrigation tubing 1232a, 1232c, and 1232d.

In FIG. 12, control reservoirs 1270a and 1270b are located in row 1262. The control reservoir 1270 can house several shared components. As shown here, control reservoir 1270a houses water pumps 1222a and 1222b and a shared float valve 1230). An additional control reservoir 1270b is located adjacent to the control reservoir 1270a. Larger control reservoirs or a larger amount of control reservoirs are needed for larger grow reservoirs or a larger amount of grow reservoirs (as the volume of water in the grow reservoirs increase, the volume of water in the control reservoirs must also be increased which can be done by increasing the size of the reservoir(s) or linking more reservoirs together). A shared water chiller 1234 is optional and as shown in FIG. 12, is located outside the control reservoir 1270b to lower the temperature of the water in all the reservoirs 1204 and control reservoirs 1270. In some implementations, the hydroponics system may not include a water chiller 1234.

The number of control reservoirs may vary. In other implementations, one control reservoir may be suitable for up to four reservoirs. Additional control reservoirs may be used if there are more than four reservoirs in a system, however, depending on the configuration of the system components, more or less control reservoirs may be used as shown, the shared water pump 1222a is a shared water pump for all the grow reservoirs 1204 in rows 1258 and 1260. The shared water pump 1222a pumps and pulls water to circulate the water in a loop in a closed configuration between the reservoirs 1204 at a constant rate.

In the implementation, the water pump 1222a pumps water through irrigation tubing 1232a from the control reservoir 1270a to the reservoir 1204a in row 1258. Water then moves through the pipes 1252a and reservoirs 1204 of row 1258, and through irrigation tubing 1232b to the grow reservoirs 1204 and pipes 1252b in row 1260, and through irrigation tubing 1232c connected to grow reservoir 1204b to return to the control reservoir 1270a. The water pumped into the first reservoir 1204a from the water pump 1222a is substantially the same amount of water pulled out of the reservoir 1204b via irrigation tubing 1232c. All the water in row 1258 that is traveling through the pipes 1252a and reservoirs 1204 in row 1258 can travel the same distance as the water in row 1260.

Each row of the grow reservoirs 1204 has a total overflow irrigation tubing 1290 with a shut off valve 1236a. Optional tubing to hose adapters (not shown) can also be located in the irrigation tubing 1290 to easily disconnect individual rows or reservoirs one at a time of needed for cleaning, harvesting, etc. When opened, the reservoirs 1204 in a row (e.g., row 1258) can drain completely into a reservoir below. For example, the complete drain out valve 1236a can empty all of the water out of the row of reservoirs (e.g., row 1258) completely via irrigation tubing (e.g., total overflow irrigation tubing 1290 and 1232b). The water can then travel down to the control reservoirs 1270a and 1270b.

As shown in FIG. 12, the control reservoirs 1270 may have their own drain out system. Water can be drained from the entire system 1200 (all the grow and control reservoirs) out from a side or a bottom wall (e.g., side wall 1210 of control reservoir 1270a through aperture 1216) through irrigation tubing 1232g. The drain out system may include a shut off valve 1236b and an adapter 1238 to facilitate water drainage from the irrigation tubing 1232g. Other configurations for a drain out system are contemplated.

Also, grow reservoirs (e.g., 1204a and 1204b) may have one or more overflow exits 1292 that starts with a filter or screen at the top of the water level, and fittings connect the overflow tubing as the excess water drains back from all of the growing reservoirs into the control reservoir 1270a on the lowest level via irrigation tubing 1232d.

In the implementation shown in FIG. 12, the drain out system of the hydroponics system 1200 may also be performed row by row (as shown and described in FIG. 4) as the drain out of each row does not need to be performed at the same time. In cases where a rolling row system has a large number of reservoirs 1204 in each row, it may not be feasible to perform a drain out of every row at the same time or day. Therefore, this implementation may include multiple drain out system capabilities. Other configurations for a drain out system are contemplated.

In the implementation shown in FIG. 12, the temperature of the water in the control and grow reservoirs may be lowered in a water chiller 1234. In FIG. 12, the water moves from a water pump 1222b in the control reservoirs 1270a via an irrigation tubing 1232e to the water chiller 1234. After the water chiller 1234 lowers the temperature of the water, the water chiller 1234 can move the water through irrigation tubing 1232f to the control reservoir 1270b. The water can then move from control reservoir 1270b through a pipe 1252b connected to control reservoir 1270a and be pumped up to the grow reservoirs 1204. The water continuously mixes and flows throughout the system.

The system 1200 in FIG. 12 also includes an air pump 1220 located on the outside of the control and grow reservoirs. The air pump 1220 is a shared component in the system and pumps air via aeration tubing 1228 into the reservoirs which pumps oxygen into the water that moves through the system 1200.

The hydroponics system 1200 is scalable, and more rows of reservoirs and control reservoirs may be added either vertically or horizontally, in any number of configurations.

FIG. 13 is an illustration of an example hydroponics system 1300 according to the present disclosure. The grow reservoirs 1304 and control reservoirs 1370 are shown in a sectional view to show that components may be located inside the reservoir. A portion of this sectional view is enlarged for magnification purposes, and only a portion of each row are shown. The system 1300 illustrates that reservoirs (e.g., control reservoirs 1370c and 1370d) may be added below a rolling row of reservoirs, in addition to an independent row of control reservoirs (e.g., control reservoirs 1370a and 1370b). For purposes of simplifying the illustration, not all duplicative components are marked.

The system 1300 shows that the grow reservoirs 1304 may be configured in multiple "rolling" horizontal rows, using as many units as desired, to eliminate and open aisles in a grow facility. The system 1300 is "rolling" in that the units or grow reservoirs 1304 may be placed on wheels in order to be moved in a grow facility. The system 1300 is configured to account for the fact that 4" pipes do not have flexibility in a rolling system. For example, a 4" pipe 1352b may be implemented in a row 1358 of reservoirs 1304, where the reservoirs can be moved together on one platform with wheels. However, if a row 1358 is on a separate platform on wheels, the reservoirs in row 1362 cannot be connected to the reservoirs in row 1358 by 4" pipes. Therefore, at least one control reservoir may be incorporated into the system 1300 to house certain system components to provide shared components for multiple rows of reservoirs. For example, in some implementations, it may be advantageous to have one control reservoir 1370 per every four grow reservoirs 1304. In system 1300, because there are multiple reservoirs in the system 1300 (some not shown), control reservoirs 1370 are added outside the rows of grow reservoirs and additional control reservoirs are added underneath the rolling rows of grow reservoirs. Additional control reservoirs and grow reservoirs may be incorporated into the system 1300. For example, in some implementations, it may be advantageous to have one control reservoir 1370 per every four grow reservoirs 1304. Grow reservoirs can also be added vertically by stacking extra levels on top of each row. Additional reservoirs can be used to expand the system vertically and/or horizontally in any number of configurations.

The disclosed configurations eliminate aisle space in the system 1300. Where other systems may require an aisle between each row, in system 1300, the rows on wheels may be moved closer together and aisle space may be reduced to as low as one aisle in the entire system, where the rows can be moved together to allow a user to walk down one aisle in between any given row for working on all the reservoirs and maximizing the size of the growing space. For example, if a user needs access to the second row 1362, the user can move the rows on wheels to create an aisle space in between rows 1358 and 1362. If the user only needs access to row 1358, the user can move row 1358 close to row 1362 and access row 1358 from the other side. By eliminating aisles, there is more space in a facility, and more space for more rows of reservoirs.

In the implementation in FIG. 1300, control reservoirs 1370 are connected to grow reservoirs in the four double rolling rows (shown) via irrigation tubing 1332. The control reservoirs 1370*a* and 1370*b*, connected via pipe 1352*a* may be moved separately from the rolling rows shown. The grow reservoirs are connected to each other via pipe 1352*b*. Other control reservoirs (e.g., control reservoirs 1370*c* and 1370*d*) may be connected to the control reservoirs 1370*a* and 1370*b* and the grow reservoirs 1304 by irrigation tubing.

In other implementations, more reservoirs may be added or removed vertically or horizontally to scale up or down to any size and configuration. In implementations where the system 1300 is scaled up with additional reservoirs 1304, additional control reservoirs 1370 may be needed. For example, in a system which includes eight rows with eight grow reservoirs in each row (a total of 64 grow reservoirs), each row may require two control reservoirs (a total of 16 control reservoirs). The reservoirs 1304 in the rows may connect to one another by pipes, and the control reservoirs 1370 may connect to one another by pipes, and the reservoirs 1304 may connect to the control reservoirs 1370 by irrigation tubing. The use of irrigation tubing in between the control reservoirs 1370 and the reservoirs 1304 allows mobility of each row, which may be on wheels, so that each row can be moved back and forth to create an open aisle in between any of the rows at a any time.

In the implementation shown in FIG. 13, by way of example, there are multiple water pumps 1322*a-c* in the control reservoir 1370*a*. There may be more than one shared water pump to maintain the water level height in the reservoirs throughout the system. A water pump 1322*a* pumps water to the control reservoir 1370*c*. A second water pump 1322*b* in control reservoir 1370*a* pumps water to the control reservoir 1370*d*. A third water pump 1322*c* in the control reservoir 1370*a* pumps water through the water chiller 1334 to control reservoir 1370*b* which is connected to 1370*a* via pipe 1352*a*.

The control reservoir 1370*c* has a water pump 1332*d* that pumps water to grow reservoirs 1304*a* located above control reservoir 1370*c*. Other control reservoirs 1370 (e.g., control reservoir 1370*d*) are located underneath grow reservoirs 1304 (e.g., grow reservoir 1304*c*) in the rolling rows of reservoirs are shown with additional water pumps. The water pump 1332*d* in the control reservoir 1370*c* is connected to the grow reservoir 1304*a* by irrigation tubing 1332*b* so that water can be pumped through the row of grow reservoirs in row 1358 and back to the control reservoir 1370*c* via irrigation tubing 1332*c*.

As shown, the grow reservoirs 1304 in each of the rows (e.g., row 1358) are connected to each other by pipes (e.g., pipe 1352*b*) to provide for water flow through the reservoirs in that row. The pipes 1352*b* are contemplated to be 4" pipes, which however, other sizes are contemplated.

The water pump 1322*d* pumps and pulls water to circulate the water in a loop for row 1358 of grow reservoirs 1304 in a closed configuration between the reservoirs at a constant rate.

Water then moves through the pipes (e.g., pipe 1352) and reservoirs 1304 of row 1358 (not all of which is shown), and back through irrigation tubing 1332*c* to return to the control reservoir 1370*c* (as described in FIG. 12).

The irrigation tubing 1332*d* connects the bottom of the control reservoirs 1370*a*, 1370*c*, and 1370*d* and is part of a drain out system where the system 1300 can be drained out from multiple control reservoirs.

Also, in the system 1300, grow reservoirs (e.g., 1304*a*) may have an overflow exit 1392 that starts with a filter or screen at the top of the water level, and fittings connect the overflow tubing as the excess water drains back from all of the grow reservoirs into the control reservoir 1370*c* via irrigation tubing 1332*e*.

In the implementation shown in FIG. 13, the drain out system of the hydroponics system 1300 may also be performed row by row (as shown and described in FIG. 4) as the drain out of each row of grow reservoirs does not need to be performed at the same time. In cases where a rolling row system has a large number of reservoirs 1304 in each row, it may not be feasible to perform a drain out of every row at the same time or day. Therefore, this implementation may include multiple drain out system capabilities per row. In FIG. 13, there is one drain out system per each row (e.g., water can be drained out from a side or a bottom wall (e.g., side wall 1310 of a reservoir 1304 through an apertures 1316, by example, in row 1358) through irrigation tubing 1332*f*. The drain out system may include a shut off valve and an adapter to facilitate water drainage from the irrigation tubing 1332*f*. Each row of grow reservoirs, each row of control reservoirs, and even individual reservoirs may include their own drain out systems. Other configurations for a drain out system are contemplated.

In the implementation shown in FIG. 13, the temperature of the water in the control reservoirs 1370*a* may be lowered in a water chiller 1334. The water moves from the control reservoirs 1370*a* via an irrigation tubing 1332*g* to the water chiller 1334. After the water chiller 1334 lowers the temperature of the water, the water chiller 1334 can move the water back through irrigation tubing 1332*h* to the control reservoir 1370*b*. The water can then move from control reservoir 1370*b* to through a pipe 1352*a* to control reservoir 1370*a* and to other rows of grow reservoirs by water pumps located in control reservoirs 1370*a* and 1370*b*.

The system 1300 in FIG. 13 may include a shared float valve (not shown). The system 1300 in FIG. 13 may also include air pumps (e.g., air pump 1320) located on the inside or outside of the reservoirs 1304. The air pump 1320 is a shared component in the system and pumps air via aeration tubing 1328 into the reservoirs 1304 which pumps oxygen into the water that moves through the system 1300. As shown here, there is an air pump 1320 located in each rolling row, and other aeration configurations are contemplated such as having one shared air pump for every single grow reservoir (or grow and control reservoir) in the system 1300.

The hydroponics system 1300 is scalable, and more grow reservoirs and/or control reservoirs may be added vertically and/or horizontally.

Referring to FIG. 14, a combination of vertical and horizontal layouts of control and grow reservoirs are implemented in a hydroponics system 1400 according to the present disclosure. The grow reservoirs 1404 and control reservoirs 1470 are shown in a sectional view to show that components may be located inside the reservoir. A portion of this sectional view is enlarged for magnification purposes, and only a portion of each row is shown. The system 1400 illustrates that control reservoirs may be added below a rolling row of reservoirs. For purposes of simplifying the illustration, not all duplicative components are marked.

In FIG. 14, a row 1458 of four grow reservoirs 1404 are located over a row 1460 of control reservoirs 1470. As shown, the grow reservoirs 1404 of row 1458 are connected to each other by pipes 1452a, and the control reservoirs 1470 of row 1460 are connected to each other by one pipe 1452b. The grow reservoirs 1404 and the control reservoirs 1470 are connected to each other by irrigation tubing 1432a and 1432b.

In FIG. 14, control reservoirs 1470a and 1470b are located in row 1460. The control reservoirs 1470 can house several shared components such as one or more float valves (not shown) for the entire system. As shown here, control reservoir 1470a houses a water pump 1422a. An additional control reservoir 1470b is located adjacent to the control reservoir 1470a and houses a water pump 1422b. Larger control reservoirs or a larger amount of control reservoirs are needed for larger grow reservoirs or a larger amount of grow reservoirs (as the volume of water in the grow reservoirs increase, the volume of water in the control reservoirs must also be increased which can be done by linking more reservoirs together or using bigger reservoirs). A shared water chiller 1434 is optional and as shown in FIG. 14, is located outside the control and grow reservoirs to lower the temperature of the water in all the reservoirs 1404 and control reservoirs 1470. In some implementations, the hydroponics system may not include a water chiller 1432 or it may include multiple water chillers.

The number of control reservoirs may vary. In other implementations, one control reservoir may be suitable for up to four reservoirs and additional control reservoirs may be used if there are more than four reservoirs in a system. However, depending on the configuration of the system components, more or less control reservoirs may be used. As shown, the shared water pump 1422a is a shared water pump for all the grow reservoirs 1404 in row 1458. The shared water pump 1422a pumps and pulls water to circulate the water in a loop in a closed configuration between the reservoirs 1404 in row 1458 at a constant rate.

In the implementation, the water pump 1422a pumps water through irrigation tubing 1432a from the control reservoir 1470a to the reservoir 1404a in row 1458. Water then moves through the pipes 1452a and reservoirs 1404 of row 1458, and through irrigation tubing 1232b to the control reservoir 1470b. The water pumped into the first reservoir 1404a from the water pump 1422a is substantially the same amount of water pulled out of the last grow reservoir 1404 (not shown) in row 1458 and through irrigation tubing 1432b. All the water in row 1458 that is traveling through the pipes 1452a and reservoirs 1404 in row 1458 can travel the same distance as the water in the other rows of the system 1400.

Each row of the grow reservoirs 1404 has a total overflow irrigation tubing 1490 (shown adjacent to reservoir 1404a) with a shut off valve (not shown), and when opened, the reservoir can drain completely into a reservoir (e.g., control reservoir 1470b) below it. When additional levels of grow reservoirs are stacked on top of each row vertically, each level (or grow reservoir) can have its own drain out system. In larger facilities, instead of draining the system all at one time or in one day, it may be more feasible to drain parts of the system at different times such as level by level or row by row. The complete drain out valve on the bottom can empty all of the water out of the row of reservoirs (e.g., row 1458) completely via irrigation tubing (e.g., irrigation tubing 1432c).

The system 1400 also has irrigation tubing 1432d connecting the bottom of the control reservoirs and is part of a drain out system where the system 1400 can be drained out from multiple rows of reservoirs. Tubing 1432d is also one of two lines of tubing used to maintain the water levels between the control reservoirs of each row. A small pump (i.e. 1422b) located in each row (i.e. 1460) of control reservoirs (i.e. 1470a and 1470b) circulates water in a loop throughout each row of control reservoirs. There can be more or less water pumps (i.e. 1422b) circulating the water throughout each row of control reservoirs depending on preferred features, etc. All of the water in the system 1400 is continuously mixing throughout the system.

In some implementations, there may also be overflow exits on all levels of grow reservoirs in each row that starts with a filter or screen at the top of the water level, and fittings connect the overflow tubing as the excess water drains back from all of the growing reservoirs into the control reservoir on the lowest level via irrigation tubing.

In the implementation shown in FIG. 14, the drain out system of the hydroponics system 1400 may also be performed row by row (as shown and described in FIG. 4) as the drain out of each row does not need to be performed at the same time. In cases where a rolling row system has a large number of reservoirs 1404 in each row, it may not be feasible to perform a drain out of every row at the same time or day. Therefore, this implementation may include multiple drain out system capabilities per row. In FIG. 14, there is one drain out system per each row (e.g., water can be drained out from a side or a bottom wall (e.g., side wall 1410 of a control reservoir 1470b through aperture 1416, by example, in row 1460) through irrigation tubing 1432e. The drain out system may include a shut off valve and an adapter to facilitate water drainage from the irrigation tubing. Other configurations for a drain out system are contemplated.

In the implementation shown in FIG. 14, the temperature of the water in the control and grow reservoirs may be lowered in a water chiller 1434. In FIG. 14, the water moves from a water pump 1422b in the control reservoirs 1470a via an irrigation tubing 1432f to the water chiller 1434. After the water chiller 1454 lowers the temperature of the water, the water chiller 1434 can move the water through irrigation tubing 1432g to the reservoirs in the system 1400.

The system 1400 in FIG. 14 also includes air pumps (e.g., an air pump 1420) located on the outside of the control and grow reservoirs. Each air pump 1420 is a shared component in the system and pumps air via aeration tubing 1428 into the reservoirs which pumps oxygen into the water that moves through the system 1400.

The hydroponics system 1400 is scalable, and more rows of reservoirs may be added either vertically or horizontally.

Figure 15:
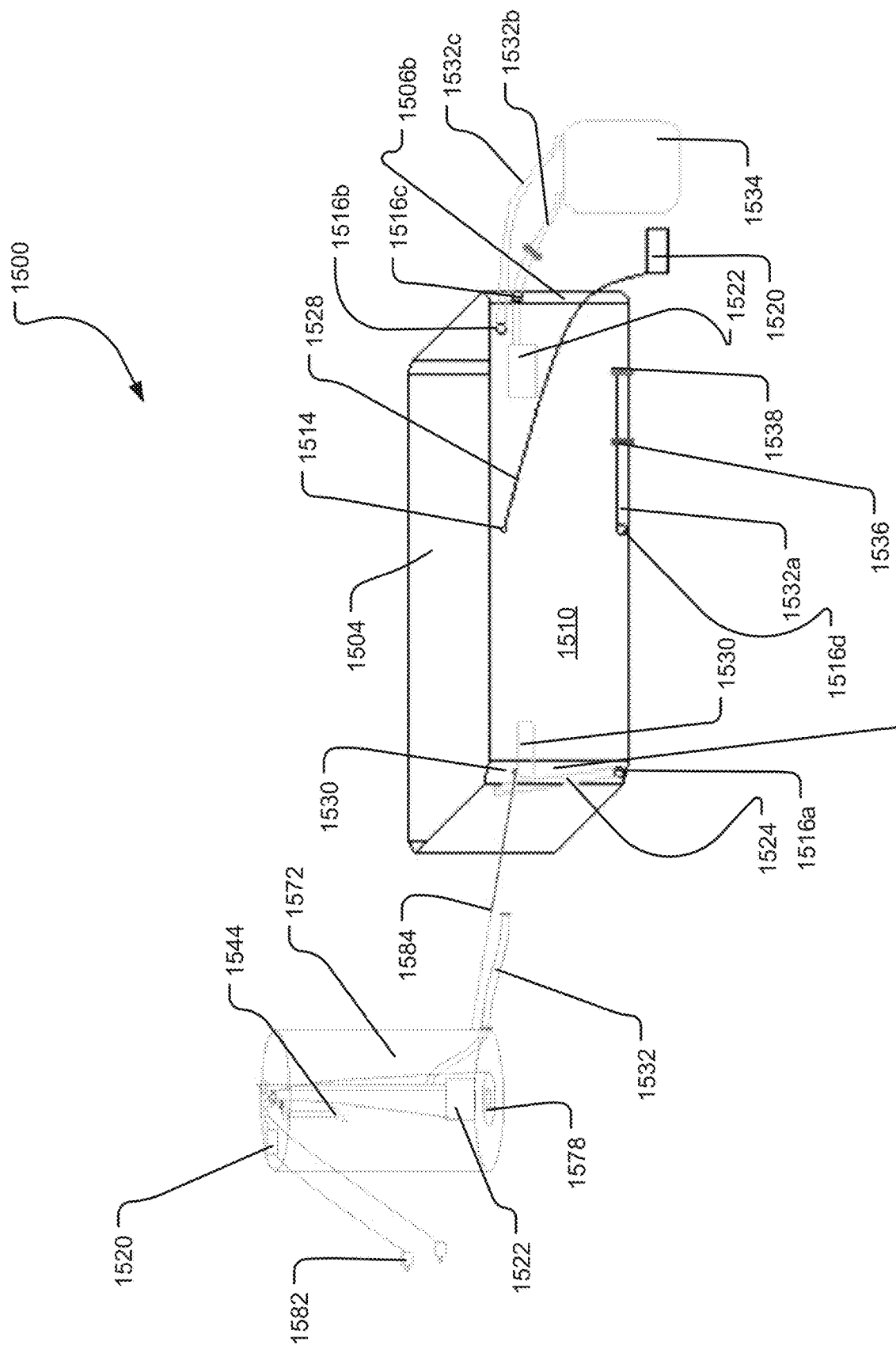
FIG. 15 is an illustration of an example hydroponics system according to the present disclosure.

FIG. 15 is an illustration of an example hydroponics system 1500 according to the present disclosure. As plants take up nutrients, the water levels in a grow reservoir 1504 will decrease and may need to be replenished. In some implementations, the grow reservoir 1504 may be refilled manually by the grower using a bucket or pump or the reservoir 1504 might have a float valve 1530 that may be attached to a water or nutrient solution source (e.g., tap, nutrient solution injector, mixing tank, reverse osmosis system, etc.) via a feed tubing 1584. The water or nutrient solution can be fed by gravity through the tubing 1584 to the float valve 1530 as shown in the FIG. 15.

As shown in FIG. 15, a grow reservoir 1504 is connected to a mixing tank reservoir drum 1572 via feed irrigation tubing 1584. A water pump 1522 can be used to drain the water via the shut off valve and tubing 1532 or to circulate the mixture inside the mixing tank reservoir drum 1572 as the water is pushed through the connect fitting 1544. An air pump 1520 and air diffuser 1578 can also be used to keep the nutrient solution oxygenated and mixed. A water chiller or water heater (not shown) can also be used to regulate the temperature inside the mixing tank.

In the system 1500 shown in FIG. 15, the grow reservoir 1504 is similar to the single unit shown and described in FIG. 3. In other implementations, other single or multiple unit reservoir systems may be used. The single grow reservoir 1504 has its own water pump 1522, water chiller 1534, and float valve 1530. The float valve 1530 may be located inside the reservoir 1504 to maintain a predetermined water level and control the continuous flow of water. In FIG. 15, a water level check valve 1524 is shown located on the flat corner wall 1506a via an aperture 1516a. Any number of features to increase ease for the grower can be added such as a water heater, etc.

An aperture 1516d in FIG. 15 is a "drain out" shown on the side wall 1510. Irrigation tubing 1532a may be connected to the aperture 1516d and include a shut off valve 1536 and an adapter 1538 to facilitate water drainage from a side or a bottom wall of the reservoir 1504.

In FIG. 15, a water pump 1522 is located inside the reservoir 1504. In some implementations, the water pump 1522 may be located outside the reservoir (e.g., water pumps in multi-unit systems. The water pump 1522 may be connected to an irrigation tubing to pump water up and out of the grow reservoir 1504.

In some implementations, as shown in FIG. 15, the water pump 1522 is connected to a water chiller 1534. Maintaining a nutrient solution within a target temperature range can be crucial for the health of plants. The water chiller 1534 can help maintain the temperature in a reservoir, specifically cooling the water (e.g., cools the water in a range of approximately 60°-75°) and returns the cooled water to the reservoir 1504 to cool the reservoir. Similarly, in some implementations, a water heater may be connected to the water pump 1532 to heat the water in the system 1500. In some implementations, a system 1500 may not include a water chiller or a water heater.

In FIG. 15, an air pump 1520 is located outside the grow reservoir 1504 and is connected to aeration tubing 1528 which connects to the reservoir. The air pump 1520 pumps air into the reservoir 1504 and may be connected to an air diffuser or an air stone (not shown) in the reservoir. The air diffuser or air stone diffuses oxygen by pumping air through a stone or tube to create bubbles which infuse the water with more oxygen.

The components described and shown in FIG. 15 may be used in a single unit hydroponics system or in a multi-unit hydroponics system. Any combination of these components may be included, depending on the desired use and processes of each system. Also, the components may be shared by reservoirs in a multi-unit system.

Figure 16:
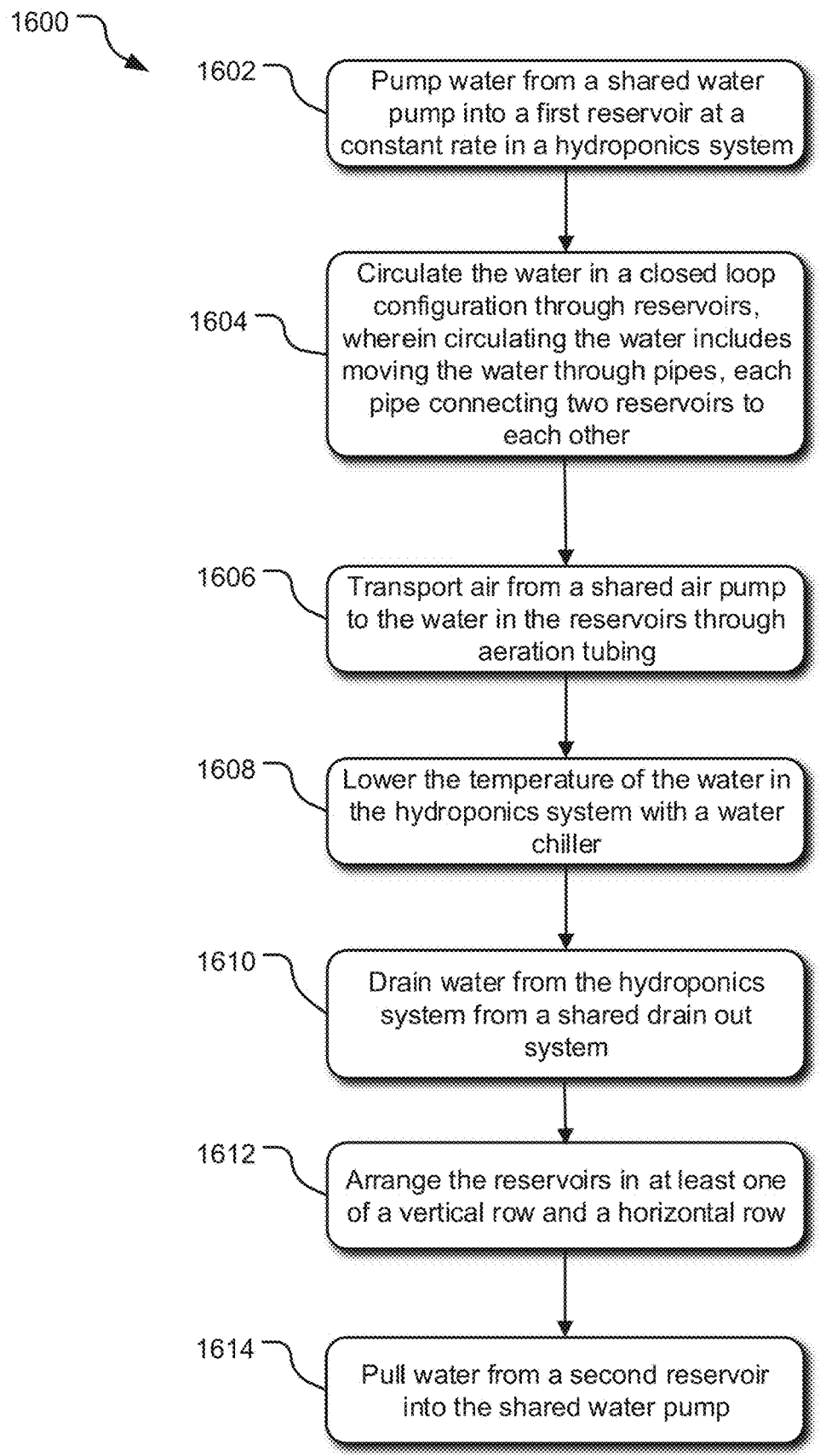
FIG. 16 is a flowchart of example operations in a hydroponics system according to the present disclosure.

FIG. 16 is a flowchart of example operations in a hydroponics system according to the present disclosure. The hydroponics system may be scalable and have any number of grow reservoirs and control reservoirs, and rows of grow reservoirs and control reservoirs, which may be added vertically and/or horizontally. The hydroponics system may include system configurations, components, and processes that are described in FIGS. 1-15 above.

Water may enter from a water source into the reservoir. In some implementations, the water may enter through a shared float valve located in a reservoir which controls the water depth in the reservoir(s). An operation 1602 pumps water from a shared water pump into a first reservoir at a constant rate in a hydroponics system. The shared water pump may be located outside the reservoir(s) or inside a grow or control reservoir. The water pump can pump water via irrigation tubing and directly into a reservoir or into a pipe which transports water to a reservoir.

An operation 1604 circulates the water in a closed loop configuration through a plurality of grow reservoirs. Circulating the water may include the water pump pushing and moving the water through a plurality of pipes and/or irrigation tubing. Each pipe connects two reservoirs to each other.

In some implementations, an operation 1606 transports air from at least one shared air pump to the water in a plurality of grow reservoirs through aeration tubing. In some implementations, there may be multiple lines of aeration tubing providing air to multiple grow reservoirs.

In some implementations, an operation 1608 lowers the temperature of the water in the hydroponics system with a water chiller. In some implementations, water can move through the hydroponics system from a water pump to the water chiller and to a reservoir. In some implementations, water can move through the hydroponics system from a water pump to the water chiller and back to the water pump before moving to a reservoir or a pipe.

In some implementations, an operation 1610 drains water from the hydroponics system from a shared drain out system. The water may be drained from a variety of drain out systems, as described above. For example, a drain out system may be located on exterior walls (e.g., bottom wall or side wall) of any one of the plurality of grow reservoirs to drain water from one or more reservoirs, and in some cases, a row of reservoirs. The drain out system may include irrigation tubing connecting any number of grow and/or control reservoirs, from which the water can be drained.

In some implementations, an operation 1612 arranges the plurality of grow reservoirs in at least one of a vertical row and a horizontal row. In some implementations, the reservoirs are configured on rolling rows. At least one control reservoir may be added to the grow reservoirs especially for vertical and/or rolling systems. Any number of reservoir layouts can be configured vertically and horizontally. Custom vertical and horizontal layouts of reservoirs can also be configured depending on the size and shape of the growing space.

An operation 1614 pulls water into the shared water pump from a second reservoir. The water may be pulled through a second pipe connected to the second reservoir via irrigation tubing. The water can move through the water pump and be pushed to circulate through the hydroponics system.

It should be understood that operations may be performed in any order, adding and omitting as desired, unless explicitly claimed otherwise or a specific order is inherently necessitated by the claim language.

The above specification, examples, and data provide a complete description of the structure, features and use of exemplary implementations of the invention. Since many implementations of the invention can be made without departing from the spirit and scope of the invention, the invention resides in the claims hereinafter appended. Furthermore, structural features of the different implementations may be combined in yet another implementation without departing from the recited claims.

What is claimed is:

1. A hydroponics system, comprising:
   at least two grow reservoirs for holding nutrient solution arranged in a first horizontal movable row;
   at least one pipe, the at least one pipe connecting two grow reservoirs of the at least two grow reservoirs and configured for transport of circulating water between the two grow reservoirs of the at least two grow reservoirs; and
   at least one shared water pump to pump water via irrigation tubing throughout the at least two grow reservoirs via the at least one pipe in a closed loop configuration, wherein each of the at least two grow reservoirs comprises at least one flat corner wall each defining at least one aperture positioned completely within the at least one flat corner wall, and wherein at least one of the irrigation tubing and the at least one pipe is received in the at least one aperture.

2. The hydroponics system of claim 1, further comprising:
   at least one shared air pump; and
   aeration tubing for transport of air from the at least one shared air pump to the at least two grow reservoirs.

3. The hydroponics system of claim 1, wherein the irrigation tubing includes:
   a first irrigation tubing for water transport from the at least one shared water pump to a first grow reservoir of the at least two grow reservoirs; and
   a second irrigation tubing for water transport from a second reservoir of the at least two grow reservoirs to the at least one shared water pump.

4. The hydroponics system of claim 1, further comprising:
   a shared water chiller configured to lower the temperature of water in the hydroponics system.

5. The hydroponics system of claim 1, wherein a bottom wall of each of the at least two grow reservoirs has at least one channel in an interior surface of the bottom wall.

6. The hydroponics system of claim 1, wherein the at least one pipe comprises at least one 4 inch pipe connecting two grow reservoirs of the at least two grow reservoirs for transport of water between the two grow reservoirs of the at least two grow reservoirs.

7. The hydroponics system of claim 1, further comprising a shared drain out system for the at least two grow reservoirs in the first horizontal movable row.

8. The hydroponics system of claim 1, further comprising a shared float valve located in one grow reservoir of the at least two grow reservoirs to maintain a predetermined water level in the hydroponics system.

9. The hydroponics system of claim 1, further comprising:
   a control reservoir connected to the at least two grow reservoirs to house shared components in the hydroponics system.

10. The hydroponics system of claim 1, wherein the first horizontal movable row of grow reservoirs is configured in a vertical layout below a second horizontal movable row of grow reservoirs.

11. A method comprising:
    arranging a plurality of grow reservoirs in at least one horizontal movable row;
    moving the at least one horizontal movable row;
    pumping water from a shared water pump into a first grow reservoir of the plurality of grow reservoirs at a constant rate in a hydroponics system;
    circulating the water in a closed loop configuration through the plurality of grow reservoirs, wherein the circulating the water includes moving the water through a plurality of pipes, each of the pipes connecting two grow reservoirs of the plurality of grow reservoirs to each other, wherein each of the plurality of grow reservoirs comprises at least one flat corner wall each defining at least one aperture positioned completely within the at least one flat corner wall, and wherein a pipe of the plurality of pipes is received in the at least one aperture; and
    pulling the water into the shared water pump from a second grow reservoir.

12. The method of claim 11, further comprising:
    transporting air from a shared air pump to the water in the plurality of grow reservoirs through aeration tubing.

13. The method of claim 11, further comprising:
    lowering the temperature of the water in the hydroponics system with a water chiller.

14. The method of claim 11, further comprising:
    pumping water from the shared water pump via a first irrigation tubing into a first pipe of the plurality of pipes and into the first grow reservoir of the plurality of grow reservoirs at the constant rate in the hydroponics system; and
    pulling the water into the shared water pump from the second grow reservoir of the plurality of grow reservoirs through a second pipe of the plurality of pipes via second irrigation tubing.

15. The method of claim 11, wherein the plurality of pipes includes 4 inch pipes.

16. The method of claim 11, further comprising:
    draining water from more than one grow reservoir of the plurality of grow reservoirs in a shared drain out system in the hydroponics system.

17. The method of claim 11, further comprising:
    arranging the plurality of grow reservoirs in at least one of a vertical layout and a horizontal layout.

18. A hydroponics system, comprising:
    a plurality of grow reservoirs for holding nutrient solution arranged in at least one horizontal movable row, wherein each of the plurality of grow reservoirs comprises at least one flat corner wall each defining at least one aperture positioned completely within the at least one flat corner wall;
    at least one control reservoir to house shared components for the at least one horizontal movable row;
    a plurality of pipes, each of the pipes connecting two grow reservoirs of the plurality of grow reservoirs in the at least one horizontal movable row, the plurality of pipes configured to transport circulating water between the plurality of grow reservoirs;
    at least one shared water pump to pump water throughout the plurality of grow reservoirs and the at least one control reservoir in a closed loop configuration;
    a first irrigation tubing for water transport from the at least one shared water pump to a first reservoir of the plurality of grow reservoirs;
    a second irrigation tubing for water transport from a second reservoir of the plurality of grow reservoirs to the at least one shared water pump, and wherein at least one of the first irrigation tubing and the second irrigation tubing is received in the at least one aperture;
    a shared float valve located in any of the plurality of grow reservoirs to maintain a predetermined water level;

a shared air pump to transport air from the shared air pump to the plurality of grow reservoirs via aeration tubing;

a shared water chiller configured lower the temperature of water in the hydroponics system; and a shared drain out system to drain water from more than one grow reservoir of the plurality of grow reservoirs in the hydroponics system.

19. The hydroponics system of claim 18, wherein the at least one control reservoir or the first horizontal movable row is stacked vertically below a second horizontal movable row.

\* \* \* \* \*